US006504552B2

(12) United States Patent
Phillips

(10) Patent No.: US 6,504,552 B2
(45) Date of Patent: Jan. 7, 2003

(54) STORING EFFECTS DESCRIPTIONS FROM A NONLINEAR EDITOR USING A FIELD CHART AND/OR PIXEL COORDINATE DATA FOR USE BY A COMPOSITOR

(75) Inventor: Michael E. Phillips, Brookline, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/802,606

(22) Filed: Mar. 8, 2001

(65) Prior Publication Data

US 2001/0033295 A1 Oct. 25, 2001

Related U.S. Application Data

(63) Continuation of application No. 09/055,046, filed on Apr. 3, 1998, now Pat. No. 6,215,485.

(51) Int. Cl.[7] .................................................. G09G 5/00
(52) U.S. Cl. ...................................... 345/726; 345/698
(58) Field of Search .............................. 345/700, 716, 345/719, 723, 726, 764, 765, 428, 581, 619, 660, 667, 672, 682, 698; 382/148, 299

(56) References Cited

U.S. PATENT DOCUMENTS

| | | | | |
|---|---|---|---|---|
| 5,404,316 A | * | 4/1995 | Klingler et al. | 345/418 |
| 5,544,240 A | | 8/1996 | Warren | 382/270 |
| 5,548,708 A | * | 8/1996 | Sakashita et al. | 345/501 |
| 5,552,890 A | | 9/1996 | Nanna et al. | 356/369 |
| 5,701,138 A | * | 12/1997 | Othmer et al. | 345/698 |
| 5,760,918 A | | 6/1998 | Tanioka et al. | 358/445 |
| 5,790,708 A | * | 8/1998 | Delean | 345/428 |
| 5,844,545 A | * | 12/1998 | Suzuki et al. | 345/156 |
| 5,852,435 A | * | 12/1998 | Vigneaux et al. | 345/428 |
| 5,933,137 A | * | 8/1999 | Anderson | 345/720 |
| 6,011,562 A | * | 1/2000 | Gagne et al. | 345/473 |
| 6,215,485 B1 | * | 4/2001 | Phillips | 345/698 |
| 6,317,153 B1 | | 11/2001 | Fasciano | 348/177 |
| 6,400,411 | | 6/2002 | Bayes | 348/572 |

OTHER PUBLICATIONS

Woods, Mark, "Formats, Fields And Standards", International Cinematographers Guild, Formats, Date unknown, pp. 1–10.
"Avid Film Composer Editing System," Avid Technology, Inc., marketing materials located at http://www.avid.com/products/film/film_composer/index.html.Jun. 29, 1998, 15 pages.*
Ohanian, et al., "Digital Filmmaking: The Changing Art and Craft of Making Motion Pictures," Focal Press, pp. 192–2233, 1998.*
Ohanian, Thomas A., "Digital Nonlinear Editing: Editing Film and Video on the Desktop," second edition, 1998, Focal Press, pp. 1–115.*
"Lightworks Editing System," Tektronix Inc., marketing materials located at wvsiwug://2http://www.tek.com/VND/Products/Lightworks/light/html, Jun. 30, 1998, 27 pages.*

* cited by examiner

*Primary Examiner*—Crescelle N dela Torre
(74) *Attorney, Agent, or Firm*—Peter J. Gordon

(57) ABSTRACT

A system, method and product are provided for resolution-independent image translation. Such system, method and product convey, through the use of a resolution-independent coordinate system, a description of location, shape, color, spline, and other distinguishing characteristics of images, including edited effects, rendered on a low-resolution image. The low-resolution images upon which the effects are imposed may be user-selected without converting high-resolution, non-digital, images into high-resolution, digital, images. Such resolution-independent information based on low-resolution images may be applied automatically, i.e., without human intervention, to reproduce the special effects on a corresponding high-resolution image. In a typical application, the user-selected, low-resolution, images upon which the effects are imposed are analog or digital video images. Also typically, the corresponding high-resolution images upon which the effects are automatically reproduced are film images.

42 Claims, 13 Drawing Sheets

|  | 1110 |  | 1120 |  |
|---|---|---|---|---|
|  | X | Y | X | Y |
|  | 740 | 486 | 2046 | 1065 |
|  | 8 | 109 | 21 | 349 |
|  | 50 | 159 | 138 | 509 |
|  | 106 | 199 | 293 | 637 |
|  | 188 | 229 | 520 | 733 |
|  | 296 | 232 | 819 | 743 |
|  | 395 | 214 | 1093 | 685 |
|  | 508 | 220 | 1406 | 704 |
|  | 501 | 252 | 1663 | 807 |
|  | 702 | 295 | 1943 | 945 |
|  | 739 | 300 | 2045 | 961 |

STORING EFFECTS DESCRIPTIONS FROM A NONLINEAR EDITOR USING A FIELD CHART AND/OR PIXEL COORDINATE DATA FOR USE BY A COMPOSITOR

CROSS-REFERENCE TO RELATED APPLICATIONS

This application claims the benefit under 35 U.S.C. 120, and is a continuation, of U.S. patent application Ser. No. 09/055,046, filed Apr. 3, 1998, now U.S. Pat. No. 6,215,485.

BACKGROUND OF THE INVENTION

1. Field of the Invention

The present invention relates generally to systems, methods, and products for image editing and, more particularly, to techniques for digital effects editing of high-resolution images.

2. Related Art

Directors and editors of motion picture films increasingly rely on image editing to produce a variety of effects to advance or enhance the story line. Some such effects do not involve complex manipulations; rather, they involve such procedures as enlarging, moving, or changing color or texture of selected portions of selected frames of a film. With respect to film, such relatively simple effects traditionally have been realized by optical effects editing; that is, by using a camera. That is, the desired effects are achieved by direct manipulation of film negatives, transparencies, and/or artistic renderings. In addition, other optical procedures typically are employed, such as the use of filters, changing magnification or focus, and so on. The objective of such procedures generally is to generate a new film negative having the desired effect.

Another system for effects editing does not employ an optical laboratory. Rather the director selects portions of the film to be scanned in order to produce a high-resolution digital image. Such digital image is then provided to a high-resolution compositor that translates such images into digital or analog video images, typically at substantially lower resolution than the original high-resolution digital image. A special effects artist, typically under the direction of the director and/or editor, renders the desired effects based on the video image. When the effect is completed to the director's or editor's satisfaction, the compositor applies the effect to the original high-resolution digital image. That is, a revised high-resolution digital image is generated that contains the original image as it has been altered by the desired special effect. This revised high-resolution digital image is then provided to a film recorder that converts it to a film image. Because of the flexibility provided by digital image manipulation, complex special effects typically may be realized. Such effects include, for example, altering an image by drawing, or imposing another image, on it. One illustration of such an effect is to change the color of a hat worn by a person in a film image. Another illustration is to change the shape or orientation of the hat. Another typical procedure is to overlay layers of images on one another. For example, one image may provide a background of the surface of the moon, another image may be of the Eiffel Tower, another image may be a character in the story line. When these images are digitally overlaid, with appropriate effects introduced so that only desired elements of each image are used, the resulting image may be of the character on top of the Eiffel Tower, on the moon.

In accordance with yet another known system, a film is provided to a telecine device; i.e., a device that converts high-resolution film images to digital or analog video images, typically at a substantially lower resolution. The director and editor view the video images to select the portions that they wish to subject to effects editing. The selected video images are then provided to a digital, non-linear, editor (DNLE). The DNLE is a device that enables a special effects artist to select any frame, or group of frames, not necessarily in temporal order (hence, "non-linear"), for special effects editing. The DNLE, in response to the commands of the special effects artist, generates the desired special effects on the video images. The DNLE also generates a data record containing the identity of the particular video frames that were subject to such special effects editing. By correlating the video images with the corresponding film images from which they were produced (referred to herein as "source frames"), the data record generated by the DNLE thus enables identification of the source frames. Such data records therefore are referred to herein as "source frame data." Further procedures in accordance with this known system typically are the same as those described above with respect to the functions of a scanner, high-resolution compositor, and film recorder. That is, the source frame data are provided to the scanner that generates high-resolution digital images of the frames of film specified in the data records. The high-resolution digital images are provided to the high-resolution compositor that displays video images to the director, editor, and/or special effects editor so that special effects may be generated. The high-resolution compositor, using position data and information regarding the rendering of the special effects based on the work of the special effects artist on the video images, generates new high-resolution digital images having the special effects. These new images are provided to the film recorder that converts them to film.

SUMMARY OF THE INVENTION

The present invention is a system, method and product for resolution-independent image translation. The present invention records and conveys, through the use of a resolution-independent coordinate system, a description of the shape, color, spline, and other distinguishing characteristics of effects rendered on a low-resolution image. Such a description is hereafter referred to as "resolution-independent." The present invention also records and conveys a resolution-independent description of the location of such effects. The low-resolution images upon which the effects are imposed may be user-selected without converting high-resolution, non-digital, images into high-resolution, digital, images. Such resolution-independent information based on low-resolution images may be applied automatically, i.e., without human intervention, to reproduce the special effects on a corresponding high-resolution image. In a typical application, the user-selected, low-resolution, images upon which the effects are imposed are analog or digital video images. Also typically, the corresponding high-resolution images upon which the effects are automatically reproduced are film images.

In one embodiment, the invention is a resolution-independent image translator. Such translator operates upon low-resolution images that have been converted from high-resolution images. A user renders effects using the low-resolution images, and the resolution-independent image translator generates a record of such effects editing. In one implementation, the low-resolution, effects-edited, images are user-selected. In one implementation, the effects are special effects.

In one implementation, the record generated by the resolution-independent image translator includes resolution-independent positional information with respect to the effects. Such positional information is also referred to herein as resolution-independent data that describes the location of an effect. In one implementation, such record includes descriptive information with respect to the effects. Such descriptive information is also referred to herein as resolution-independent data that describes location-related distinguishing characteristics of the effects. In one aspect, such descriptive information, positional information, or both, is pixel-based. In a further implementation, such record includes source frame information.

In one embodiment, such record of effects editing is a data structure of metadata. In one implementation, the metadata includes resolution-independent positional information with respect to the effects, descriptive information with respect to the effects, and source frame information. In one aspect, such descriptive information, positional information, or both, is pixel-based.

In one implementation, the resolution of the metadata is user-selectable. In one aspect of such implementation, a graphical user interface enables such user-selection. In one aspect, such graphical user interface includes graphical elements for user selection of horizontal or vertical source scan size. In a further aspect, such graphical user interface includes graphical elements for user selection of horizontal or vertical source grid offset. In yet a further aspect, such graphical user interface includes graphical elements for user selection of grid type, such type including field chart grid and X-Y coordinate grid. In one implementation, such graphical element for user selection of grid type includes graphical elements for selection of one or more aspect ratios.

In one embodiment, the resolution-independent image translator provides the graphical user interface to the user together with the low-resolution image upon which the user renders the effects. In one implementation of such embodiment, the resolution-independent image translator also overlays a grid upon such low-resolution image. In one aspect of such implementation, such grid is provided at a user-selected resolution, and in a user-selected grid type.

In one embodiment, the resolution-independent image translator formats the metadata in a standard machine-to-machine format. In one implementation, such format is the OMF file format. In one implementation, such formatted metadata is encrypted. In one embodiment, the metadata is provided to a camera. In one embodiment, the metadata is provided to a high-resolution compositor.

In one embodiment, the low-resolution, effects-edited, images are analog or digital video images that have been converted from high-resolution film images. In one implementation of such embodiment, such conversion is provided by a telecine device. In one implementation, the low-resolution images have been effects-edited by the use of a digital non-linear editor.

In one embodiment, the resolution-independent positional, or effects description, information is in an X-Y coordinate system. In one implementation, the resolution-independent positional, or effects description is in a field-chart system. In one implementation, the resolution-independent positional, or effects description is in both an X-Y, pixel-based, coordinate system, and in a field-chart system.

In one embodiment, the invention is a resolution-independent image translation system. Such translation system (a) converts high-resolution images to corresponding low-resolution images; (b) enables user selection of high-resolution images based on the corresponding low-resolution images; (c) enables effects editing of the corresponding low-resolution images; (d) produces a record of such effects editing including resolution-independent positional and effects description information; and (e) provides such record to a high-resolution compositor or a camera.

In one embodiment, the invention is a method for resolution-independent image translation. Such method includes the steps of (a) converting high-resolution images to corresponding low-resolution images; (b) enabling user selection of high-resolution images based on the corresponding low-resolution images; (c) enabling effects editing of the corresponding low-resolution images; (d) producing a record of such effects editing including resolution-independent positional and effects description information; and (e) providing such record to a high-resolution compositor or a camera.

BRIEF DESCRIPTION OF THE DRAWINGS

The above and further advantages of the invention will be more clearly appreciated from the following detailed description when taken in conjunction with the accompanying drawings, in which like reference numerals indicate like structures or method steps, in which the leftmost one or two digits of a reference numeral indicate the number of the figure in which the referenced element first appears (for example, the element 302 appears first in FIG. 3, the element 1010 appears first in FIG. 10), solid lines generally indicate control flow, dotted lines generally indicate data flow, and wherein:

FIG. 11 is an illustrative table showing an exemplary resolution-independent conversion of portions of the metadata of FIG. 6 by the resolution-independent image translator of FIG. 8.

DETAILED DESCRIPTION

The attributes of the present invention and its underlying method and architecture will now be described in greater detail in reference to one embodiment of the invention, referred to as a resolution-independent image translator 500, or simply translator 500. Aspects of translator 500 are represented in FIGS. 5 through 11. In order to more clearly describe the features of translator 500, related systems as represented in FIGS. 1–4B are also described.

Related Art—FIGS. 1–4B

Figure 1:
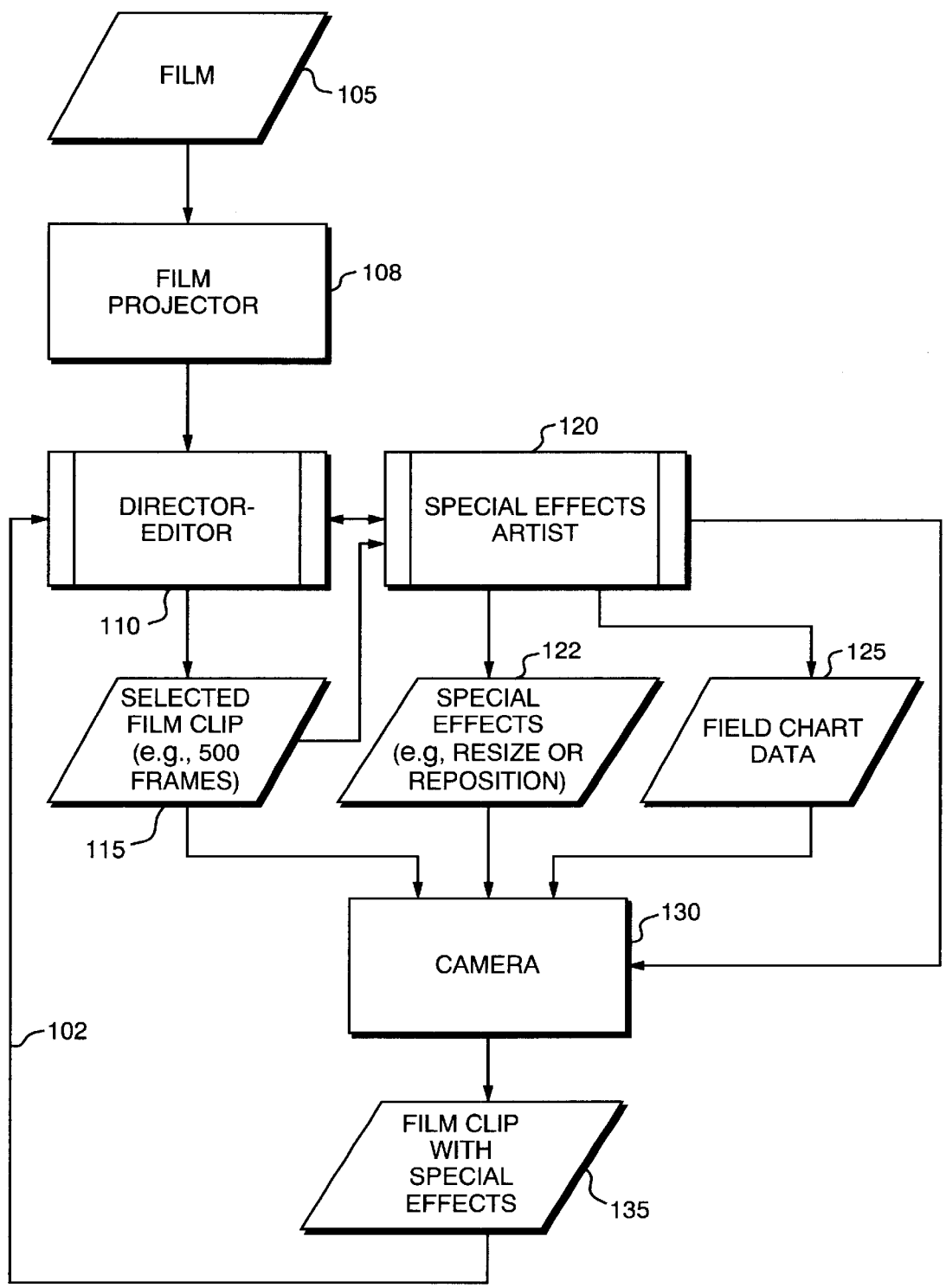
FIG. 1 is a functional block diagram of a known system for traditional optical effects editing.

The Traditional Optical-Effects Editing System of FIG. 1

FIG. 1 is a functional block diagram of a known system for traditional optical effects editing. Film 105 traditionally includes one or more rolls of exposed and developed 35 millimeter, or other gauge, film negatives. Film 105 may be the product of an editing process to select takes based on the performances of the actors, to achieve a desired rhythm or pace of the story line, and so on. Such process may be referred to as editorial editing, and such editing is immaterial to describing the system of FIG. 1. It is therefore assumed for clarity of illustration that film 105 contains any editorial editing that may have been desired, although it will be understood by those skilled in the relevant art that such editing may also take place within the system of FIG. 1. To be contrasted with editorial editing is what is referred to herein as "special effects editing." As noted, special effects editing implements a variety of changes to the images of film 105, or portions thereof. In general, special effects editing includes effects as simple as a dissolve to as complex as the creation of a composite image including tens or hundreds of layers of images, each of which may contain other special effects such as selective distortion of portions of an image, selective coloring of an image, morphing, and so on.

Generally, such relatively complex special effects editing is not readily accomplished on a system such as shown in FIG. 1. Rather, such systems are best suited to course image manipulations, such as resizing or repositioning of image elements within one or more frames of film 105. To accomplish such special effects, director-editor 110 views film 105, or portions of it, on film projector 108. It will be understood that director-editor 110 (hereafter, simply "editor 110") typically includes two persons, a director and an editor, although one person may perform both directing and editing functions, or a number of people may perform one or both of such functions. Similarly, special effects artist 120 (hereafter, simply "artist 120") may be the same person as the director or editor.

Typically, editor 110 consults with artist 120 to determine which of the numerous frames of film 105 should be subject to special effects editing. As is evident to those skilled in the relevant art, the number of such frames typically is numerous because a conventional projection rate for film is 24 frames per second, or another rate sufficiently fast to generate a motion picture effect. For illustrative purposes, it is assumed that editor 110 selects for special effects editing selected film clip 115, consisting of 500 frames of film 105. It will be understood that although the term "film clip" is used, often denoting an independe layable, entity, such term is used in the present context to denote any group or groups of frames of film 105, whether or not contiguous or in temporal order. Selected film clip 115 may also consist of a single frame of film 105.

Artist 120, who may be a photographer, conventionally imposes a positioning aid (not shown) on selected frames of selected film clip 115. Such selected frames are chosen based on a determination of how the desired special effect may best be integrated into the various frames of selected film clip 115. Also, certain such selected frames may be "key frames," that is, for example, frames that designate the start, intermediate point, or end of an effect such as a foreground object moving across a background landscape. Part of the special effect applied in such an illustrative example is the placement by artist 120 of special effects markers on key frames in order to define the path of the moving object. Such collection of special effects markers is conventionally referred to as a "spline" or "path."

Figure 2A:
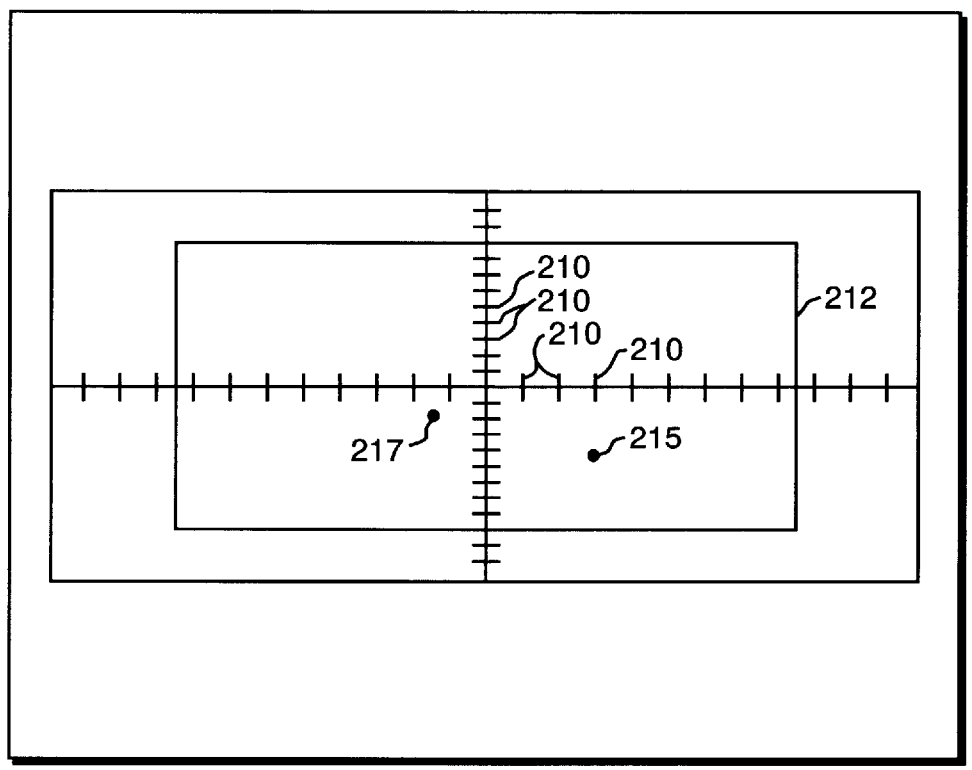
FIG. 2A is a graphical representation of a 12-field chart overlay, with grid markings and exemplary special effects markers.
Figure 2B:
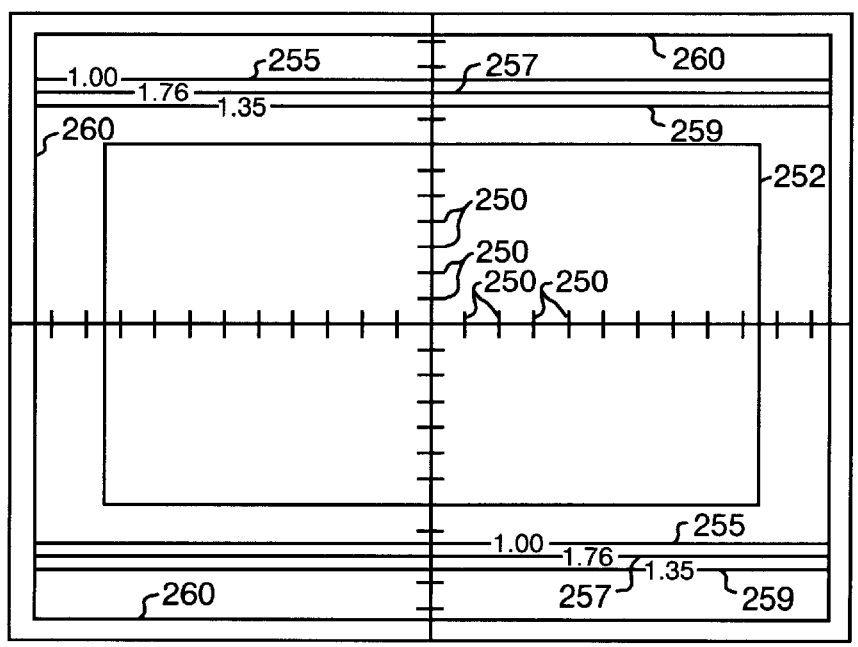
FIG. 2B is a graphical representation of a 16-field chart overlay, with grid markings.

The positioning aid typically is a field chart overlay that is made of a transparent material, such as clear plastic, and includes a grid for identifying positions on such selected frames. The field chart overlay commonly is said to be "synchronized" with the film frame when the edges of the overlay coincide with the edges of the film frame. Illustrative examples of two types of field chart overlays commonly used in the film industry are shown in FIGS. 2A and 2B. In particular, Figure A shows a type of field chart overlay that is commonly referred to as a "12-field chart." That is, both the height and width of the film frame upon which the overlay is placed are divided into 12 parts by the grid of the overlay, such as partially represented by grid marks 210. Similarly, FIG. 2B shows a "16-field chart." That is, both the height and width of the film frame upon which the overlay is placed are divided into 16 parts by the grid of the overlay, such as partially represented by grid marks 250. In both charts, boxes 212 and 252 represent what are commonly referred to as "safe-title" areas for a selected aspect ratio. Another commonly used type of field chart overlay (not shown) is referred to as a "10-field chart" because it divides both the height and width of the film frame into 10 parts.

All such types of field chart overlays typically are available in two varieties: wide-screen (cinemascope), and non-wide screen (standard). Field chart overlays used for non-wide screen applications typically are available in various aspect ratios (i.e., the ratio of width to height), such as 1:1.66 (shown as lines 255 of Figure B), 1:1.75 (lines 257), and 1:1.85 (lines 259). Field chart overlays used for wide-screen applications typically are available in an aspect ratio of 1:2.35 (box 260).

It is common practice in the film industry to indicate a location on a film frame by specifying a position in terms of either a 10-field, 12-field, or 16-field chart overlay. For illustrative purposes, it is assumed that editor 110 and artist 120 employ the 12-field overlay shown in FIG. 2A. A compass system typically is used; for example, spot 15 is referenced by the coordinates 3 east/4 south. Greater specificity typically may only be provided in accordance with conventional techniques by referring to "one-fourth field jumps," wherein each such jump is over one of four "sub-fields" within each of the 10, 12, or 16 fields. That is, such subfield jumps are interpolations of ¼, ½, or ¾ of the distance between two successive grid marks. Such interpolated grid designations typically, however, are not shown on the field chart overlay, but are estimated by editor 110 and artist 120. Thus, for example, spot 17 of FIG. 2A may be specified by the coordinates 1.5 west/1.5 south. However, greater specificity, such as 1.62 west/1.48 south, is not conventionally employed.

In this illustrative example, it is assumed that points 15 and 17 are special effects markers, for example, such as may be used to indicate that a cone, the tip of which is initially located at point 15, should be moved to the location at point 17. By determining points 15 and 17, editor 110 and artist 120 have generated field chart data, shown in FIG. 1 as field chart data 125. Typically, such data is simply entered onto an appropriate form (not shown) or verbally communicated. Also typically included on such form, or communicated, is color information regarding the illustrative special effects markers, or other information to describe the placement and characteristics of the special effects. For example, the information "R: 255, G: 0, B: 0" may be entered on the form to indicate that point 15 or 17 (or other figure, such as a line or shape, in another illustrative example) is to be rendered as pure red; i.e., with no green or blue components.

As shown in FIG. 1, artist 120 is thus enabled to employ camera 130 to impose a special effect, generally represented by special effects 122, at the locations indicated in field chart data 125. (It will be understood that a photographer, camera operator, or another person other than artist 120 may so employ camera 130.) Such specification of locations is repeated for each special effect, if any, on the selected frames of selected film clip 115. Thus, new negatives, including special effects, typically are produced by camera 130 employing the location information in field chart data 125. Such new negatives are represented in FIG. 1 by film clip with special effects 135.

Such traditional optical effects editing, however, has significant limitations in some applications. Of substantial relevance with respect to the advantages presented by the present invention, and has been noted above, traditional optical effects editing generally is not a feasible technique for implementing relatively complex special effects. Also it is difficult to determine whether the implementations of the desired special effects are satisfactory until the processes of creating and viewing film clip with special effects 135 are completed. If the effects are not satisfactory, it typically is necessary to repeat some, or all, of the processes of selecting selected film clip 115, determining the nature of the desired special effects, positioning the special effects by using a field chart overlay, creating new negatives with camera 130, and analyzing the results. Also, specification of positional information using a field chart overlay typically involves the participation of editor 110 and/or artist 120. In addition, traditional optical effects editing requires the use of an optical laboratory that, because of lighting considerations, may not conveniently be located with respect to the principal work place of editor 110 and/or artist 120. Further, such editing typically requires the services of a photographer or operator, who, as noted, may be an individual other than artist 120. Thus, traditional optical effects editing, while often efficient for implementing simple special effects, may sometimes be time consuming and expensive, particularly if the desired effect is not initially achieved.

Figure 3:
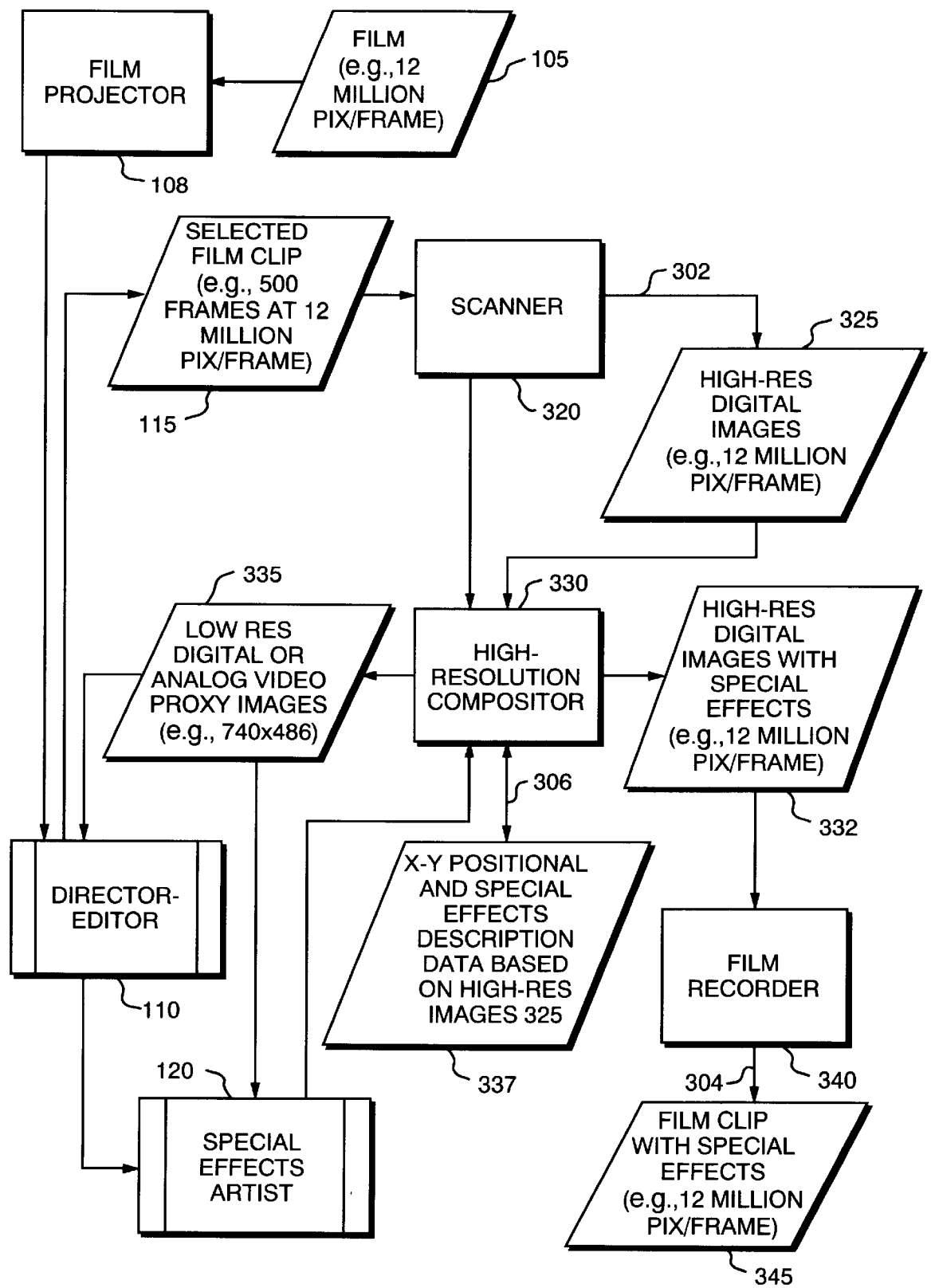
FIG. 3 is a functional block diagram of a known system for high-resolution, scanned-input, effects editing.

The High-Resolution, Scanned-Input, Effects Editing System of FIG. 3

FIG. 3 is a functional block diagram of a known system for high-resolution, scanned-input, effects editing. The process begins as described for the traditional optical effects editing system of FIG. 1; that is, editor 110 views all or portions of film 105 using film projector 108 in order to select particular portions that will be considered for special effects editing. It is again assumed for illustrative purposes that editor 110 selects 500 such frames, represented by selected film clip 115. Although selected film clip 115 may constitute only a little more than 20 seconds of film 105 (at a projection rate of 24 frames per second), the amount of information contained in those 500 frames is substantial. The number of pixels contained in a typical frame of 35 millimeter film is in the order of twelve million (4,000 by 3,000 pixels). Because each pixel is identified by location within a frame, color, and possibly other factors (such as texture), the amount of data used accurately to represent twelve million pixels, for example in digital form, may constitute on the order of 40 million bytes for each frame of film.

In accordance with the known system of FIG. 3, and unlike that of FIG. 1, a tool for creating special effects using high-resolution digital images is employed. There are many types of such tools, generally and collectively referred to herein as "high-resolution compositors." Examples of such available high-resolution compositors include Media Illusion™ made by Avid Technology, Inc., Cineon® FX System by Eastman Kodak Company, After Effects® by Adobe Systems Incorporated, Domino® by Quantel Limited, and FLAME™ or Illuminaire by Discreet Logic Inc. Such a high-resolution compositor is represented in FIG. 3 as compositor 330.

Compositor 330 uses as input high-resolution, digital, images of the frames of selected film clip 115, shown as high-resolution digital images 325. Images 325 typically contain all data necessary to accurately represent the approximately twelve million pixels in each frame of clip 115; that is, as noted, on the order of 40 million bytes of data. A device commonly referred to as a "scanner," represented by scanner 320, typically is employed to convert the information in the frames of selected film clip 115 to high-resolution digital images 325 for use by compositor 330. As used throughout the descriptions of illustrative embodiments herein, the term "scanning," and its grammatical equivalents, refer to the process of converting a high-resolution film image to a high-resolution digital image. More generally, a scanner may be any high-resolution digitizer. A number of film scanners are available, typically employing one or more of a variety of technologies and devices such as cathode ray tubes, lasers, and charge coupled devices, as well as various shuttle systems. One example of a scanner is found in the Genesis Plus system from Eastman Kodak Corporation.

Because of the large amounts of data involved, and other considerations, a significant amount of time typically is used to scan each frame of film. For example, it may require approximately ten seconds to scan one frame and convert it to a high-resolution digital image (as represented in FIG. 3 by data-flow line 302 from scanner 320 to image 325). The cost of such a scan varies depending on the type and cost of equipment used for scanning, the media used to store the digital data, and other factors. For illustrative purposes, it will be assumed that such scan cost typically is in the range of five dollars per frame.

Compositor 330 generates images 335 that typically are low-resolution, digital or analog, video images. The resolution of video images 335 typically varies depending on the industry-standard video format employed, possibly the type of monitor or screen used to display such images, and other factors. A typical resolution for video images 335 is a matrix of 640 by 480 pixels (i.e., 307,200 pixels per frame) for video images using the NTSC industry standard commonly used in the United States and other areas, and 740 by 486 pixels (i.e., 359,640 pixels per frame) for the PAL industry standard commonly used in Europe and other areas. As is thus evident, such use of such low-resolution video images substantially reduces the amount of information that is provided by compositor 330 to artist 120. Such reduced information thus enables the use of less costly monitors or screens, and associated image-storing and image-generating hardware, and otherwise generally reduces the time and expense required to develop special effects.

Video images 335 may thus be said to serve as "proxies" for high-resolution digital images 325. That is, artist 120, typically under the direction of editor 110, renders or specifies a special effect using a frame of low-resolution video proxy images 335 instead of the corresponding frame of high-resolution digital image 325. For example, to specify the location in a frame of high-resolution digital image 325 at which to place the tip of a cone, artist 120 positions a mouse-driven cursor, or employs any other known positioning device or scheme, to select a desired location on the frame of low-resolution video proxy images 335. Typically, a special effects marker is displayed by compositor 330 at such location that, for illustrative purposes, is assumed to be halfway across both the horizontal and vertical axes of such low-resolution video frame.

Unlike the position-designating scheme using field chart overlays and coordinates described above with respect to the system of FIG. 1, compositor 330 typically employs an X-Y coordinate scheme based on pixels to designate such selected location of the special effects marker, where X is the horizontal direction and Y is the vertical direction. (Also, as noted, the positional information refers in the system of FIG. 3 to a location selected by viewing a frame of low-resolution video proxy images 335, rather than by viewing a frame of selected film clip 115 as in the system of FIG. 1.) Thus, if proxy images 335 are displayed in the 740 by 486 pixels format of the PAL standard, the illustrative halfway marker is displayed at coordinates 370X-243Y of such frame of proxy images 335. Typically, the 0X-0Y coordinate is deemed to coincide with the bottom, left-most, corner of video proxy images 335, but such placement is not material.

As artist 120 is rendering the desired special effect on video proxy image 335, compositor 330 records positional information with respect to the special effect. However, such positional information typically is recorded in reference to high-resolution digital images 325, rather than low-resolution video proxy images 335 upon which artist 120 makes location decisions. That is, referring to the illustrative example of the placement of the special effects marker for the tip of the cone at coordinates 370X-243Y of the illustrative frame of proxy images 335, compositor 330 converts such low-resolution coordinates to correspond with the high-resolution coordinate system of high-resolution images 325 (referred to for convenience as "up-converting").

A typical high-resolution digital image may have a resolution of 4,000 pixels along the X axis and 3,000 pixels along the Y axis. Scanner 320 may be adjusted in accordance with conventional techniques to produce other resolutions of images 325, depending on the resolution of film 105 being scanned, the capabilities of the scanner, the amount of time or expense involved, a desire to enlarge or reduce the images of film 105, or other factors. Referring to the illustrative example in which images 325 have a resolution of 4,000 by 3,000 pixels, compositor 330 thus typically up-converts the low-resolution coordinates 370X-243Y by direct proportional scaling, thus resulting in corresponding high-resolution coordinates of 2,000X-1,500Y. However, any other scaling technique may be used.

Compositor 330 typically also generates information that describes the rendered special effect. For example, it may record the information, based on the special effect inputs specified by artist 120 in reference to video proxy image 335, that the special effect marker at 370X-243Y is a filled circle having a center located at those coordinates, a radius of 5 pixels, and a color that is pure red. Resolution-dependent aspects of such information, such as the radius of the circle, typically is also up-converted by compositor 330 to the high-resolution coordinate system of images 332. Such up-converted special effects description information, and the up-converted high-resolution positional information, is represented in FIG. 3 by data block 337. That is, data block 337 represents X-Y positional data and special effects description data based on high-resolution digital images 325.

Two-way data flow line 306 between compositor 330 and data block 337 indicates that compositor 330 (a) generates the information in data block 337 as described; and (b) also utilizes such information, together with the data in high-resolution digital images 325, to generate a high-resolution digital image containing the special effects described in data block 337. Such high-resolution digital image with special effects is represented by data block 332. Typically, data block 332 preserves all of the information contained in the corresponding frames of selected film clip 115, as altered by the special effect rendered by artist 120 using low-resolution video proxy image 335. High-resolution digital image 332 thus, in the illustrative example, has a resolution of approximately twelve million pixels per frame.

In accordance with the system of FIG. 3, high-resolution digital image 332 is provided to a device commonly referred to as a "film recorder," such as film recorder 340. A variety of film recorders are available, such as Lightning II by the Eastman Kodak Company. Film recorder 340 produces a film negative, which in this illustrative example is a frame of film clip 345 of FIG. 3, corresponding to high-resolution digital image 332. Film clip 345 thus incorporates the special effects included in high-resolution digital image 332. The creation of film clip 345 by film recorder 340 is represented by data-flow line 304. As noted above with respect to data-flow line 302 between scanner 320 and high-resolution digital image 325, such process involves the manipulation of large amounts of data and thus typically consumes significant amounts of time and money.

Due to the flexibility of digital image manipulation, the system in accordance with FIG. 3 enables artist 120 to implement complex special effects. Such system, however, typically is expensive to operate because of the cost of producing high-resolution digital images 325 (line 302) and of producing film clip 345 (line 304). In particular, with respect to producing high-resolution digital images 325, it generally is not known which of perhaps hundreds, or thousands, of film frames are to be manipulated to generate the desired special effect. Thus, all of such frames typically are converted to high-resolution digital images (line 302) at significant cost and with significant time expenditure. For example, 500 frames in selected film clip 115 may be scanned so that they may be considered by editor 110 and artist 120 for special effects editing. The time used for such scanning in this illustrative example may be approximately 83 minutes (5,000 seconds) and the cost may be $2,500. A significant portion of such time and expense may be wasted if, for example, it is determined that only 50 frames need be manipulated to implement the desired special effect.

Also of potential significance in some applications is the fact that the system in accordance with FIG. 3 does not provide field-chart data, such as field chart data 125, that may be used to generate special effects by the traditional optical effects editing system of FIG. 1. An example of circumstances in which such an option would be desirable is if editor 110 or artist 120 determine, upon applying a complex special effect to certain frames of selected film clip 115, that such special effect would be enhanced by resizing or repositioning portions of other frames in selected film clip 115, or in film 105. Although such relatively simple special effects as resizing or repositioning may be accomplished in accordance with the system of FIG. 3, it may be much less expensive, and quicker, to implement them by traditional optical effects editing. In order to do so, editor 110 and artist 120 typically generate field chart data 125 outside of the system of FIG. 3. Moreover, film clip 345, containing the special effects generated in accordance with the system of FIG. 3, is edited in the optical laboratory without the benefit of positional information regarding such special effects. In other words, two different systems of positional information for specifying special effects are used: one with respect to digital image manipulation in accordance with the system of FIG. 3, and another with respect to traditional optical effects editing in accordance with the system of FIG. 1. In addition to the 16 extra time that such duplicative effort inherently entails, it will be appreciated by those skilled in the art that the services of the optical laboratory may not be immediately available, thus imposing more delay and/or expense.

Figure 4A:
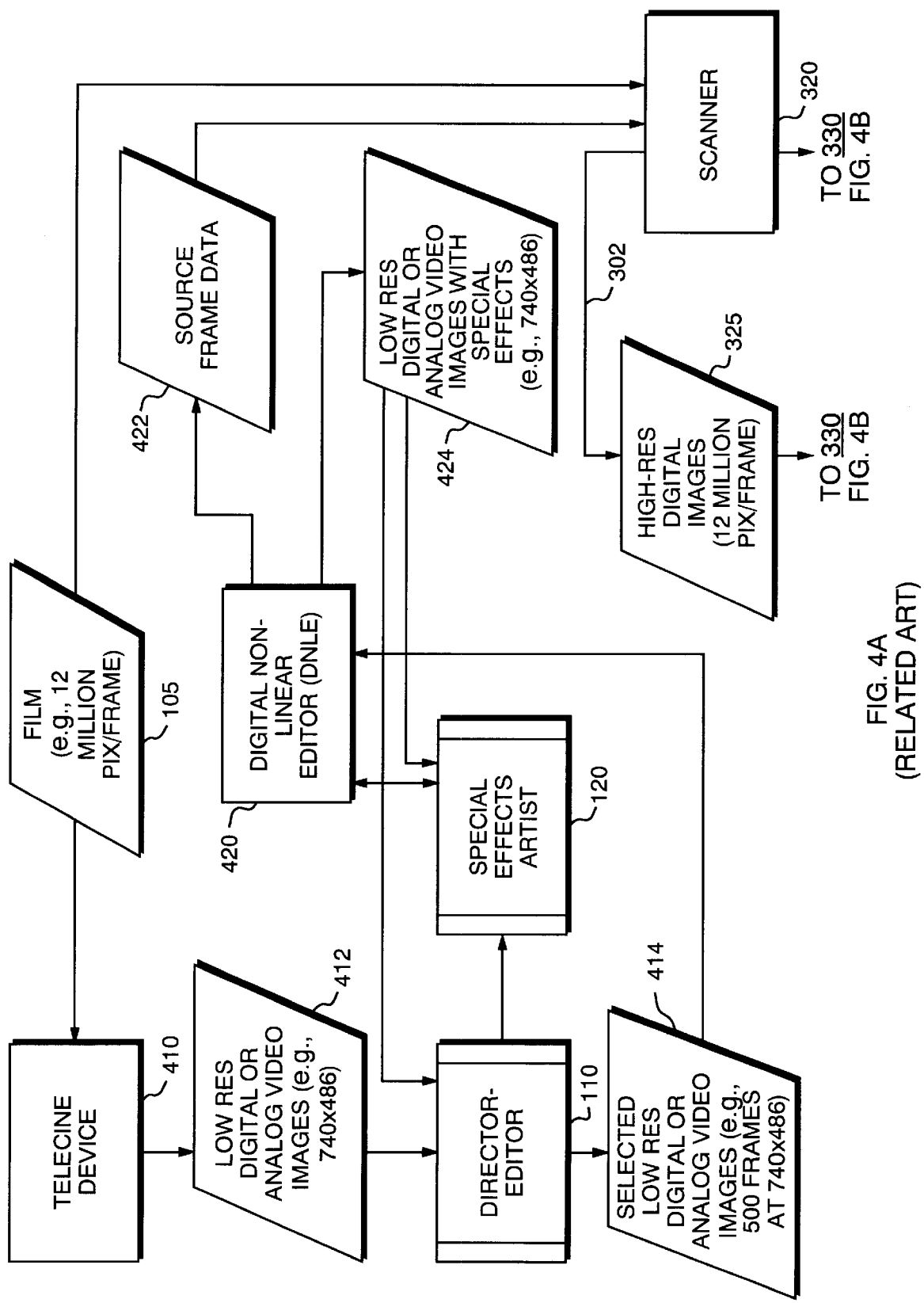
FIGS. 4A–4B is a functional block diagram of a known system for selective-scanning, resolution-dependent, effects editing, including a digital non-linear editor.
Figure 4B:
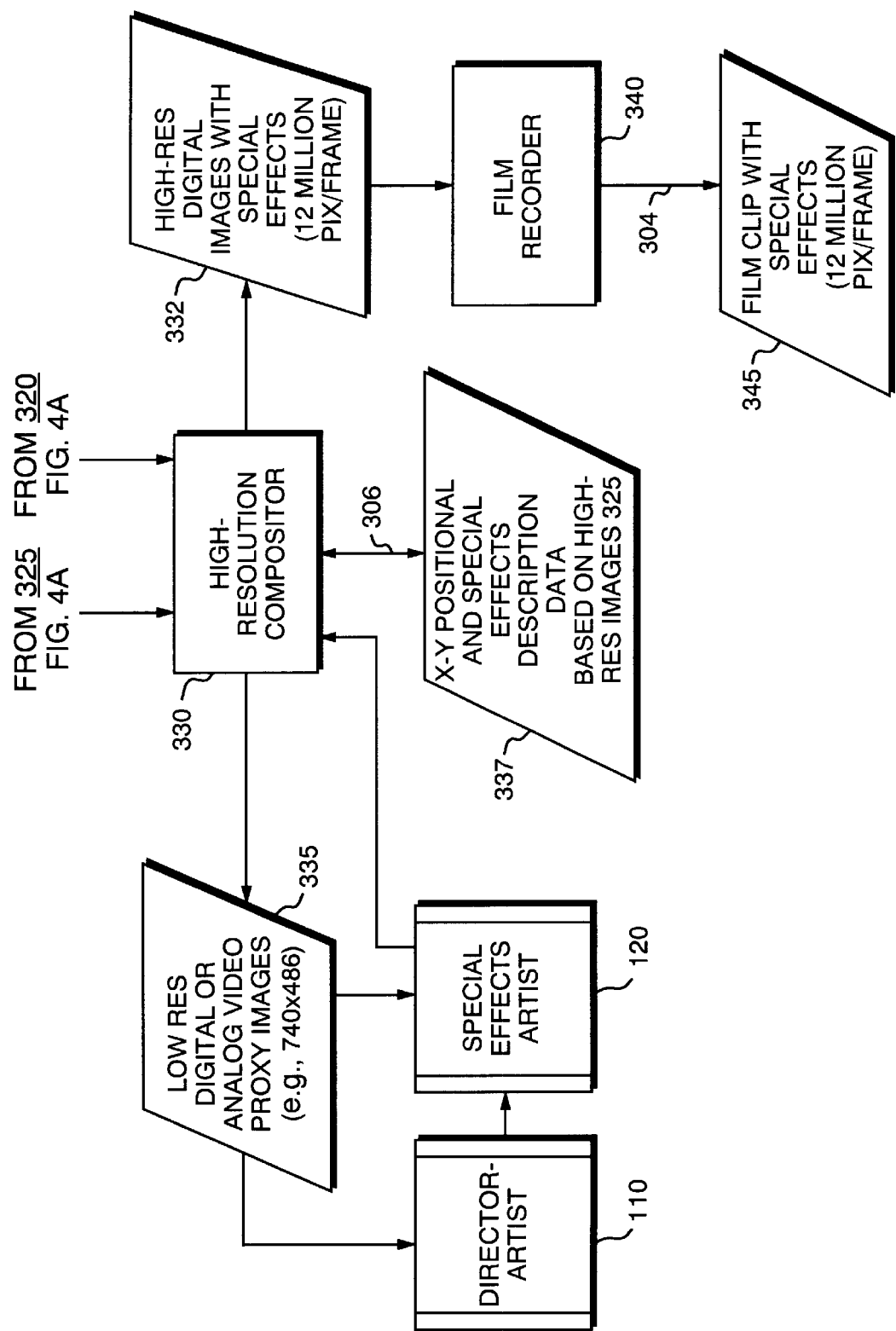

The Selective-Scanning, Resolution-Dependent, Effects Editing System of FIGS. 4A–4B FIGS. 4A–4B illustrate a functional block diagram of a known system for selective-scanning, resolution-dependent, effects editing. Unlike the systems of FIGS. 1 and 3, the editing process of the system of FIGS. 4A–4B does not begin with the projection of film images to editor 110 and artist 120. Rather, film 105, or any desired portion of it, is provided to telecine device 410. A telecine device converts film images to video images. Thus, in the illustrated example, telecine device 410 converts high-resolution film 105 to low-resolution, digital or analog, video images 412.

Editor 110 views low-resolution video images 412 and selects certain frames, shown as selected low-resolution video images 414, for special effects editing. Consistent with the previous example in which 500 frames were selected, it is assumed for illustrative purposes that 500 frames of images 412 are selected to be selected images 414. In one implementation involving digital video images, an intermediate, known, function of compressing selected video images 414 may be performed to reduce the resources needed to store them. Such digital compression device is not shown in the illustrative example of FIGS. 4A–4B, but will be understood to be optionally present in FIGS. 4A–4B (and in FIGS. 5A–5B, described below).

In contrast to the system of FIG. 3, in which high-resolution compositor 330 was used to render the desired special effects, artist 120 renders the desired special effects in the system of FIGS. 4A–4B by using a low-resolution editor, such as digital non-linear editor (DNLE) 420. A variety of such editors exist, including Film Composer® by Avid Technology, Inc., Lightworks™ or Heavyworks™ by Tektronix, Inc., Media 100 by Data Translation, Inc., Digital Studio by Softimage Inc., and others.

In particular, DNLE 420 receives selected low-resolution video images 414 and, at the direction of editor 110 and artist 120, displays selected frames of such images to artist 120 for special effects rendering. Such selected frames are represented in FIGS. 4A–4B as low-resolution images with special effects 424, which may be analog or digital. The process of such special effects editing may be illustrated by using the previous example of marking a location in a selected frame at which to place the tip of a cone. Following the previous example, artist 120 is assumed to select a point halfway along both the X and Y axes for such placement. It will be recalled that, with respect to the system of FIG. 3, such point is specified by the coordinates 370X-243Y on a frame of video proxy images 335 generated by compositor 330. In contrast, in the system of FIGS. 4A–4B, such point is specified by the coordinates 370X-243Y (again assuming a video image format of 740 by 486) on a frame of low-resolution video images 424 generated by DNLE 420.

Editor 110 and artist 120 view the special effects displayed in images 424 to determine if the rendering is satisfactory. To achieve such satisfactorily rendered special effects, it typically is not necessary to edit all 500 of the selected low-resolution video images 414 of the illustrative example. For instance, it may be determined that special effects editing of only 50 frames satisfactorily implements the desired special effects. DNLE 420 notes which frames of low-resolution images 424 have been edited to implement the desired special effects, correlates such frames with the corresponding frames of film 105 that were the source from which such frames of images 424 were derived, and records the identification of such frames of film 105. The recording of such information is accomplished in accordance with any of a variety of known techniques and formats, and is represented in FIGS. 4A–4B by source frame data 422.

Significantly, DNLE 420 of the known system of FIGS. 4A–4B does not generate high-resolution positional and special effects data such as that described above with respect to data block 337 of FIG. 3, nor does DNLE 420 generate film images with special effects. Rather, a separate process is undertaken to generate such data as is represented by data block 337, and to generate film with special effects such as is represented by film clip with special effects 345.

This separate process, involving scanner 320, high-resolution compositor 330, and film recorder 340, is essentially the same as that described above with respect to the functions of such devices in the system of FIG. 3. That is, scanner 320 scans selected frames of film 105 to generate high-resolution digital images 325 (line 302). Images 325 are provided to high-resolution compositor 330 to produce low-resolution video images 335 that are displayed to editor 110 and artist 120 for the rendering of the special effects (typically, the same special effects as rendered with reference to low-resolution video images 412 generated by of DNLE 420). As represented by data block 337, compositor 330 generates X-Y positional data and special effects description data based on high-resolution images 325. Compositor 330 uses data 337, and high-resolution digital images 325, to generate high-resolution digital images with special effects 332. Film recorder 340 converts images 332 to film clip with special effects 345. However, as noted, scanner 320 in the system of FIG. 4 operates upon frames of film 105 identified in source frame data 422 as the result of special effects editing using DNLE 420, whereas scanner 320 in the system of FIG. 3 operates upon frames of film 105 selected by editor 110 upon viewing film 105 prior to special effects editing.

Thus, in comparison to the system of FIG. 3, the system of FIGS. 4A–4B typically reduces the expensive and time-consuming process of scanning many frames of film into high-resolution digital images, as represented by data flow line 302 shown in FIGS. 3 and 4A–4B. That is, line 302 of FIG. 3 represents, in the illustrated example, such scanning of 500 frames. In contrast, line 302 of the system of FIGS. 4A–4B represents the scanning only of those frames of film 105 identified in source frame data 422 as having special effects rendered upon them. Such difference may typically be in the order of a ten-fold or more decrease; that is, in accordance with a previous example, only 50 frames of film 105 may be identified in source frame data 422 in a typical application of special effects. Therefore, the cost of such scanning in accordance with the system of FIGS. 4A–4B may be approximately $250 and take 500 seconds, as compared with $2,500 and 5000 seconds, respectively, with respect to the system of FIG. 3.

However, such use of DNLE 330 to save time and expense in selecting and scanning frames of film 105 typically results, as noted, in redundant rendering of the desired special effects. This redundancy occurs because special effects rendered using DNLE 420 are not available in a form that may be used by compositor 330. Such redundant activity is indicated in FIGS. 4A–4B by the dual set of occurrences of function blocks representing editor 110 and artist 120: one set with respect to operation of DNLE 420, and one set with respect to operation of compositor 330.

It also is significant that the creation of film clip with special effects 345, in accordance with the system of FIGS. 4A–4B (and also in accordance with the system of FIG. 3), is "resolution-dependent." Such term in this context indicates that X-Y and special effects description information 337 is generated by compositor 330 in relation to, and at the resolution of, high-resolution digital images 325. Thus, the rendering of special effects artist 120 implemented in high-resolution images with special effects 332 is not transferable to an X-Y coordinate system different than that employed by scanner 320 to generate data 325. Similarly, the system of FIGS. 4A–4B does not provide special effects positional information in the form of field-chart data, such as field chart data 125 of FIG. 1.

Resolution-Independent Effects Editing—FIGS. 5A–11

Figure 5A:
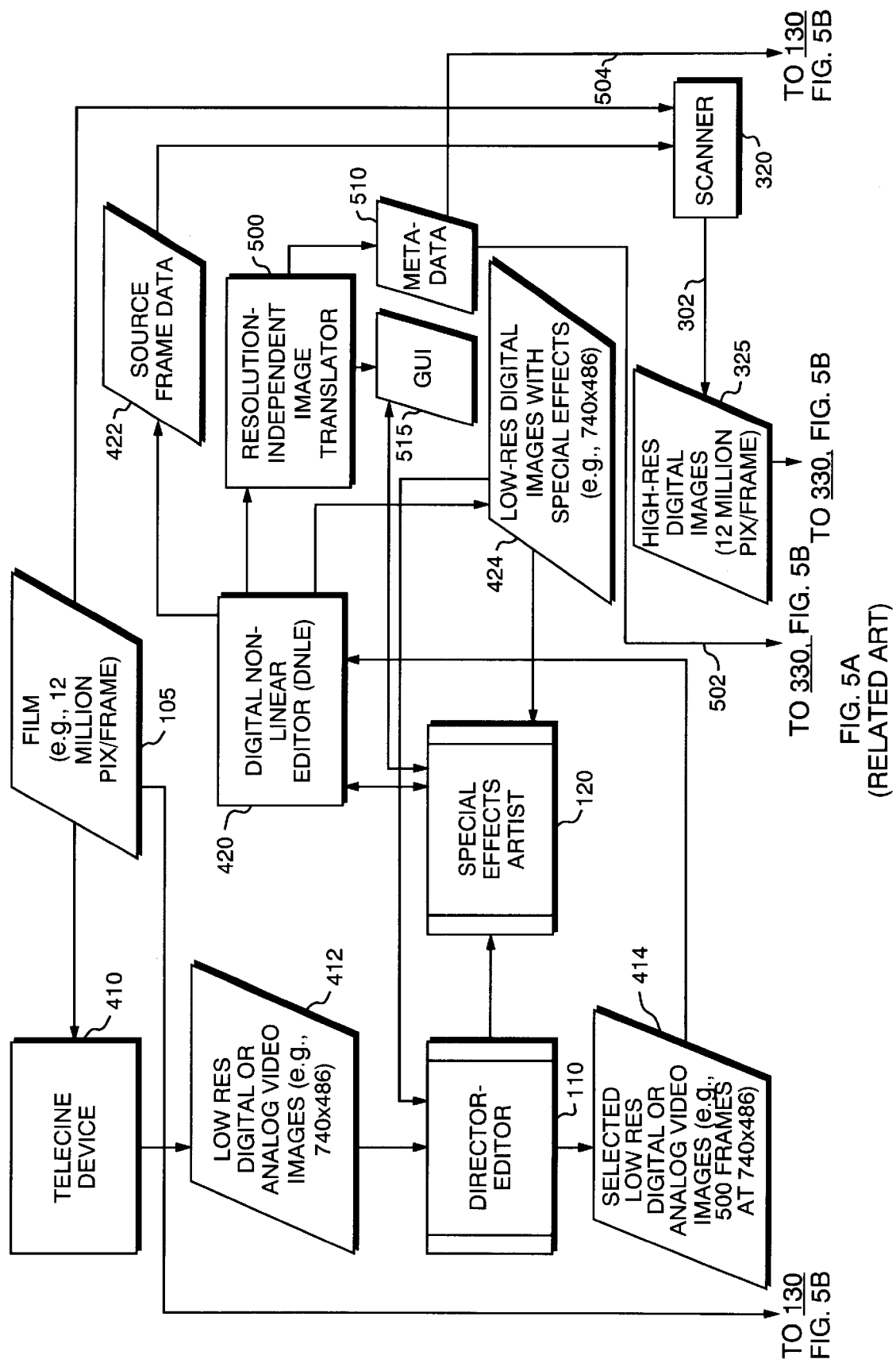
FIGS. 5A–5B is a functional block diagram of one embodiment of a system in accordance with the present invention for resolution-independent, pixel-based, effects editing, including a resolution-independent image translator.
Figure 5B:
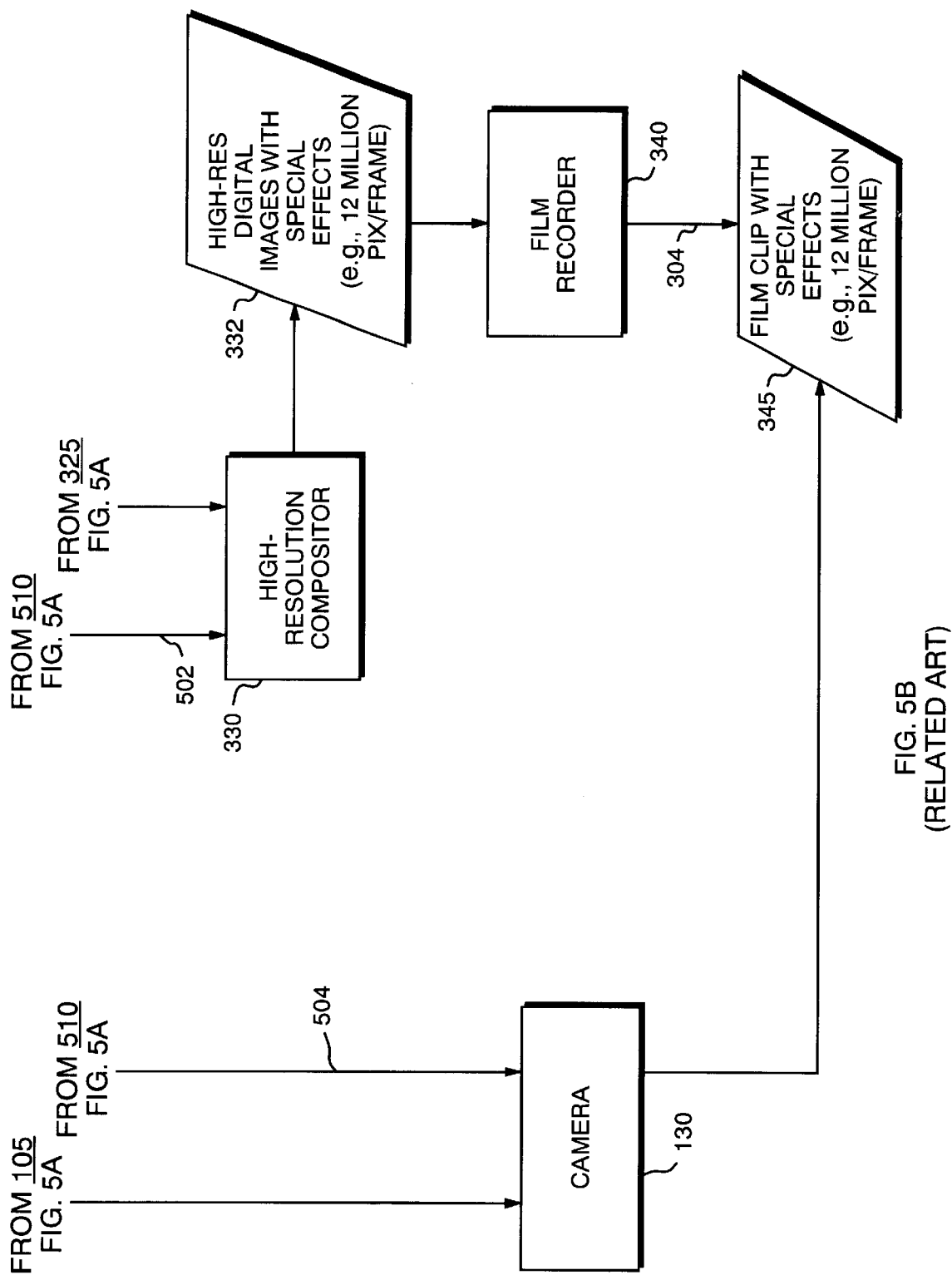

FIGS. 5A–5B illustrates a functional block diagram of one embodiment of a system in accordance with the present invention for resolution-independent effects editing. The initial operations of the system of FIGS. 5A–5B relating to telecine device 410 and DNLE 420 are the same as those described above with respect to the system of FIGS. 4A–4B. That is, editor 110 selects frames for special effects editing based on the low-resolution video images 412 provided by telecine device 410. Such selected low-resolution video images 414 are provided to DNLE 420, and may typically include a substantially larger number of frames than will prove necessary for rendering of the desired special effects. In this regard, the illustrative example is again referred to in which images 414 include 500 frames. DNLE 420 displays selected frames of such low-resolution images to artist 120 for rendering of special effects on such selected frames, as represented by low-resolution, video images with special effects 424. Images 424 may be analog or digital.

Editor 110 and artist 120 view the special effects displayed in images 424 to determine if the rendering is satisfactory. As with respect to the system of FIGS. 4A–4B, it may be determined that special effects editing of only 50 frames is needed to implement the desired special effects. DNLE 420 notes which frames of low-resolution images 424 have been so edited, and correlates such frames with the corresponding frames of film 105. The resulting information is represented in FIGS. 5A–5B by source frame data 422. Thus, as noted, the systems of FIGS. 4A–4B and 5A–5B operate essentially the same with respect to the functions of telecine device 410 and DNLE 420. In particular, both systems enable editor 110 and artist 120 selectively to identify frames of film 105 to be scanned by scanner 320 based on the results of special effects viewed in low resolution. Such selectivity, as noted, typically reduces cost and time expenditure substantially.

However, it will be recalled that, with respect to the system of FIGS. 4A–4B, special effects rendered using DNLE 420 are not available in a form that may be used by compositor 330. Thus, a redundant process is performed of re-rendering the special effects using compositor 330 operating on scanned high-resolution digital images 325. That is, with respect to the system of FIGS. 4A–4B, artist 120 recreates the special effects by viewing low-resolution video proxy images 335. Compositor 330 generates X-Y and description data 337 based on a scaled, resolution-dependent, translation of the renderings of artist 120 with reference to video proxy images 335. Compositor 330 uses data 337 to generate high-resolution images with special effects 332.

In contrast, the system of FIGS. 5A–5B eliminates such a redundant process. Rather, the system of FIGS. 5A–5B includes resolution-independent translator 500 that generates resolution-independent, positional and description data. In particular, translator 500 provides both resolution-independent X-Y coordinates and resolution-independent field chart information relating to the special effects rendered by viewing low-resolution video images 414. Translator 500 also provides information describing such rendered special effects. All such information provided by translator 500 is represented in FIGS. 5A–5B by data block 510. Such information is hereafter referred to as "metadata," and, thus, data block 510 is referred to as metadata 510.

Figure 6:
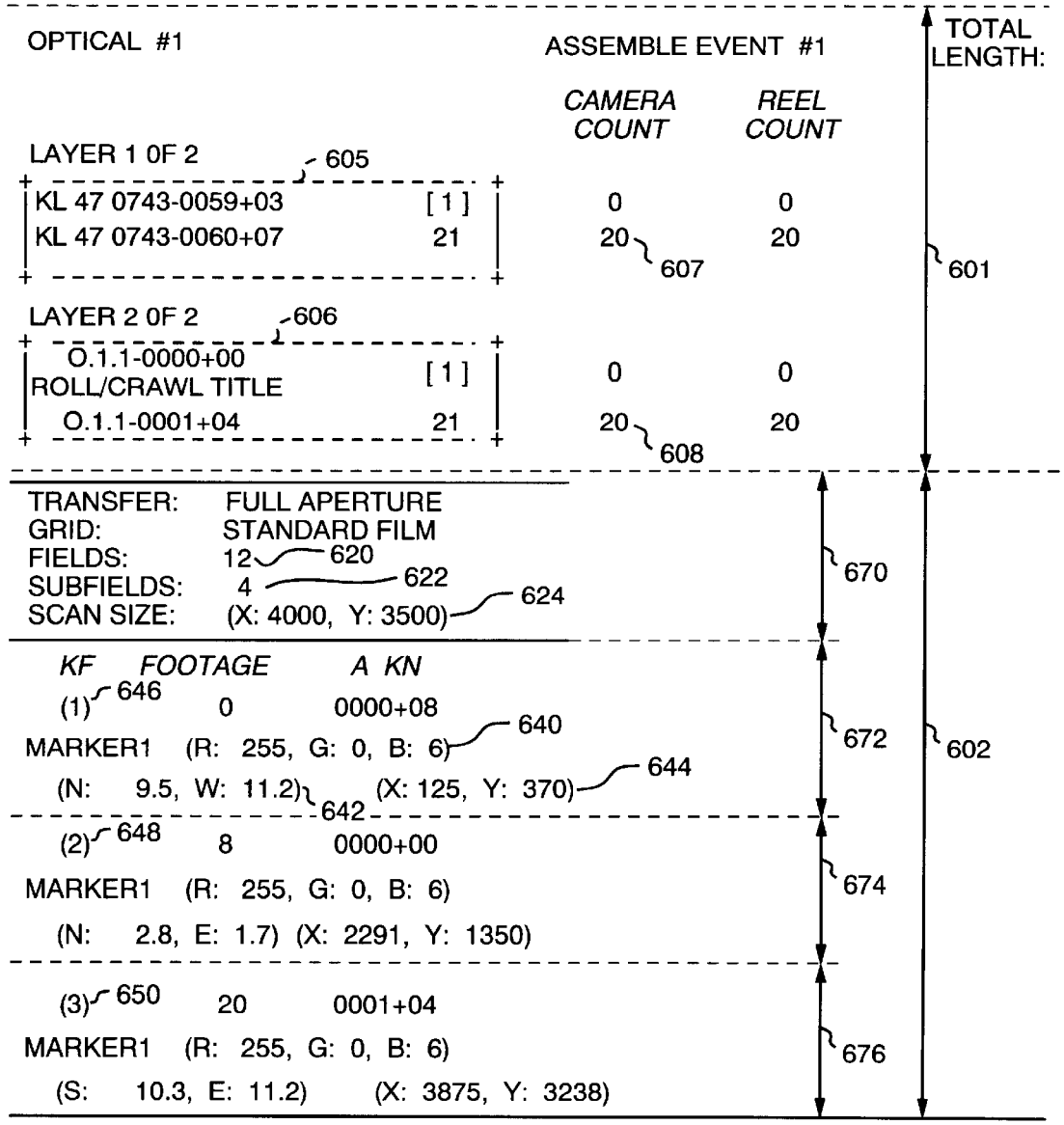
FIG. 6 is an exemplary partial printout of data showing an illustrative example of source frame data provided by the digital non-linear editor of FIGS. 4A–4B, and of metadata provided by the resolution independent image translator of FIGS. 5A–5B.

FIG. 6 is an exemplary partial printout of data showing an illustrative example of source frame data 422 and metadata 510. It will be understood that the format of such printout is chosen arbitrarily for illustrative purposes, and that many other representations of source frame data 422 and metadata 510 are possible. As noted below, source frame data 422 and metadata 510 typically are transferred electronically in a format such as the open media framework (OMF) format, or the Advanced Authoring Format (AAF) from the Multimedia Task Force. In the illustrative example of FIG. 6, the portion of the figure labeled for convenience of reference as "601" includes source frame data 422. The portion of the figure labeled for convenience of reference as "602" includes a representative portion of metadata 510. Typically, such portion 602 extends to provide substantially more of the type of information shown in FIG. 6. That is, for example, each shape, spline, or other special effects element in each key frame typically is included in metadata 510, but is not shown in FIG. 6.

With respect to source frame data 422 shown in portion 601, element 605 specifies the location of a frame of film 105 so that such frame may be provided to scanner 320. Element 606 specifies the location of another frame of film 105 so that, for example, the two frames may be overlaid by compositor 330 to generate a composite image. Elements 607 and 608 indicate that the frames specified by elements 605 and 606 are the first of 20 frames, respectively, that should be provided to scanner 320 in this illustrative example. That is, 40 frames are to be scanned in order to implement a desired special effect, such as compositing.

Metadata 510, shown in portion 602, includes subportions that, for convenience of reference, are labeled as subportions 670, 672, 674, and 676. Subportion 670 includes information specifying the type of field chart (number of fields and subfields) to be used in rendering the special effect using a camera. In particular, element 620 specifies that artist 120 has selected for possible use a field chart overlay having a resolution of 12 fields (in both horizontal and vertical directions) per frame, and element 622 specifies that artist 120 has selected a subfield resolution of 4 subfields per field. However, as described below in relation to GUI 515 and FIG. 10, artist 120 may, in accordance with the system of FIGS. 5A–5B, select any field and subfield resolution for providing more precise positional information. That is, artist 120, in accordance with the present invention, is not limited to specifying the location of a special effect by the traditional 10-field, 12-field, or 16-field resolution, and is not limited to interpolations between fields of one-fourth increments (i.e., decimal fractions of 0.25, 0.50, or 0.75).

Element 624 specifies that scanner 320 has been set to an X-Y coordinate resolution of 4,000 pixels along the X coordinate, and 3,500 pixels along the Y coordinate. However, as also described below in relation to GUI 515 and FIG. 10, artist 120 may, in accordance with the system of FIG. 5, select any X-Y coordinate resolution for providing more precise positional information. That is, artist 120, in accordance with the present invention, is not limited to specifying the location of a special effect by the traditional pixel resolution of high-resolution digital images such as those produced by scanners such as scanner 320.

Subportion 672 includes positional and special effects description information regarding one illustrative special effect rendered by artist 120. The special effect is to be applied to a particular frame of those frames specified in portion 601 (constituting source frame data 422). For example, the value in element 646 under the heading "KF" indicates that subportion 672 refers to a frame referred to as keyframe number 1 (KF1). The location of KF1 in film 105 is specified by the values under the adjoining headings labeled "Footage" and "A KN." Element 640 describes the special effect that, in this illustrative example, is special effects marker number 1. In particular, the description information is that marker 1 is to be rendered in a color specified by combinations of red, green and blue. The resolution-independent location in KF1 for marker 1 is specified in both field chart coordinates (element 642) and in X-Y coordinates (element 644). Specifically, if a camera is to be used (line 504), the marker will be placed at 9.5 grid lines north, and 11.2 grid lines west. If a high-resolution compositor is to be used (line 502), the marker will be placed at 125 pixels along the X coordinate and 370 pixels along the Y coordinate. Similar information is provided in subportions 674 and 676 with respect to the description and location of markers 2 and 3, as indicated by elements 648 and 650.

Because field-chart data (for example, element 642) is included in metadata 510, such field-chart data automatically may be provided to camera 130, as indicated by data-flow line 504. The word "automatically" in this context means that it is not necessary for editor 110 and/or artist 120 manually to locate positional information on a field chart overlay, as is typically the practice in accordance with the system of FIG. 1. Rather, as noted, metadata 510 includes positional information in standard field-chart forms, and such information may be printed out, provided on removable storage media, sent electronically over a network, or otherwise provided for use with camera 130. In contrast with the system of FIG. 1, it therefore may not be necessary for editor 110 or artist 120, who often work under time pressure, to be involved in the implementation of special effects in the optical laboratory. Because the systems of FIGS. 3 and 4A–4B do not provide positional information in field chart form, they are not relevant to the creation of special effects in the optical laboratory according to the system of FIG. 1. Thus, they also do not include the time-saving feature of automatically providing field chart information for use with camera 130.

In addition to enabling editor 10 automatically to provide the field chart information of metadata 510 for use with camera 130, translator 500 also enables editor 110 to provide metadata 510 to compositor 330, as represented by data-flow line 502. Typically, such transfer of data is accomplished by providing metadata 510 in one of a variety of industry-standard formats, such as the OMF format, the AAF format, or in accordance with any other machine-to-machine protocol that may be read by compositor 330. Such data transfer may be accomplished in accordance with any of a variety of known techniques, such as storing the data on a floppy disk or other medium and providing such medium to compositor 330; transmitting the data over a local, wide-area, or other network; or any other data-transfer technique now known or later to be developed. Typically, such transfer of metadata 510 to compositor 330 is accomplished automatically by translator 500; that is, without editor 110, or any other person, initiating or enabling such transfer.

Using metadata 510 (rather than data 337 of the system of FIGS. 4A–4B), compositor 330 generates high-resolution, digital, images with special effects 332. Film recorder 340 utilizes images 332 to generate film clip with special effects 345, as noted above with respect to the systems of FIGS. 3 and 4A–4B. Thus, in the system of FIGS. 5A–5B, neither editor 110 nor artist 120 need be involved in the operations of compositor 330 and film recorder 340.

Figure 7:
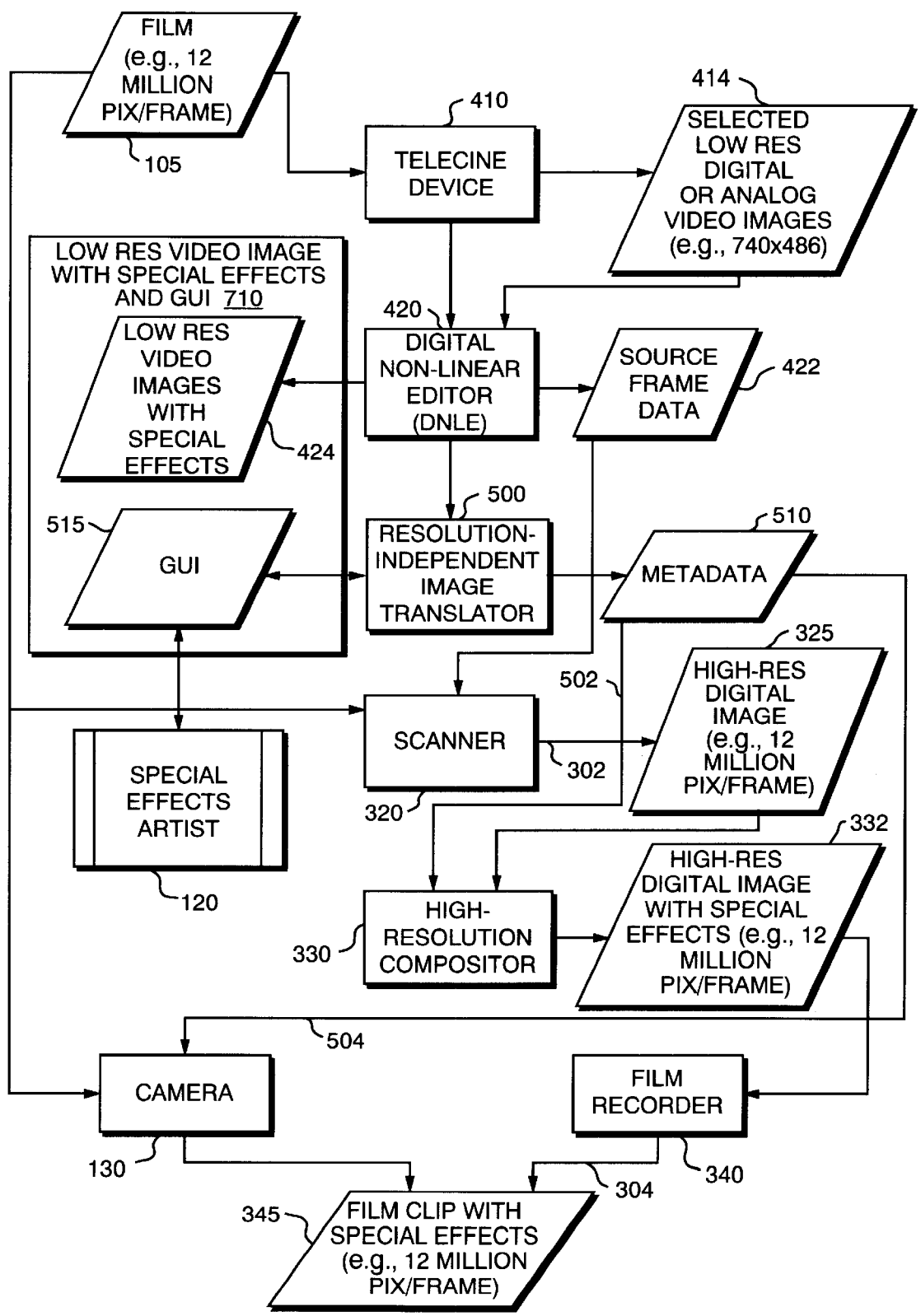
FIG. 7 is a simplified functional block diagram of the system of FIGS. 5A–5B, also including one implementation of a screen including a low-resolution video image with special effects and a graphical user interface.

FIG. 7 is one embodiment of a simplified functional block diagram of the system of FIGS. 5A–5B. FIG. 7 is provided only to clarify, and not to alter the description or illustration of, the resolution-independent effects editing system of FIGS. 5A–5B as described above. As shown in FIG. 7 and noted above, DNLE 420 generates low-resolution video images with special effects 424, that is viewed by artist 120 so that artist 120 may render special effects. Also as noted, translator 500 generates GUI 515 that presents options and receives selections with respect to the resolution of the positional and description information of metadata 510.

FIG. 7 shows one implementation by which low-resolution video images with special effects 424 and GUI 515 may be presented to artist 120 (and/or to editor 110). Such implementation includes low-resolution video images with special effects 424, and GUI 710, hereafter collectively referred to simply as "screen 710." Techniques for the display of screen 710, and other aspects of the operation of DNLE 420 of the system of FIGS. 5A–5B and translator 500, are now described in relation to an exemplary digital film workstation upon which translator 500 may be implemented.

Digital Film Workstation 810

Figure 8:
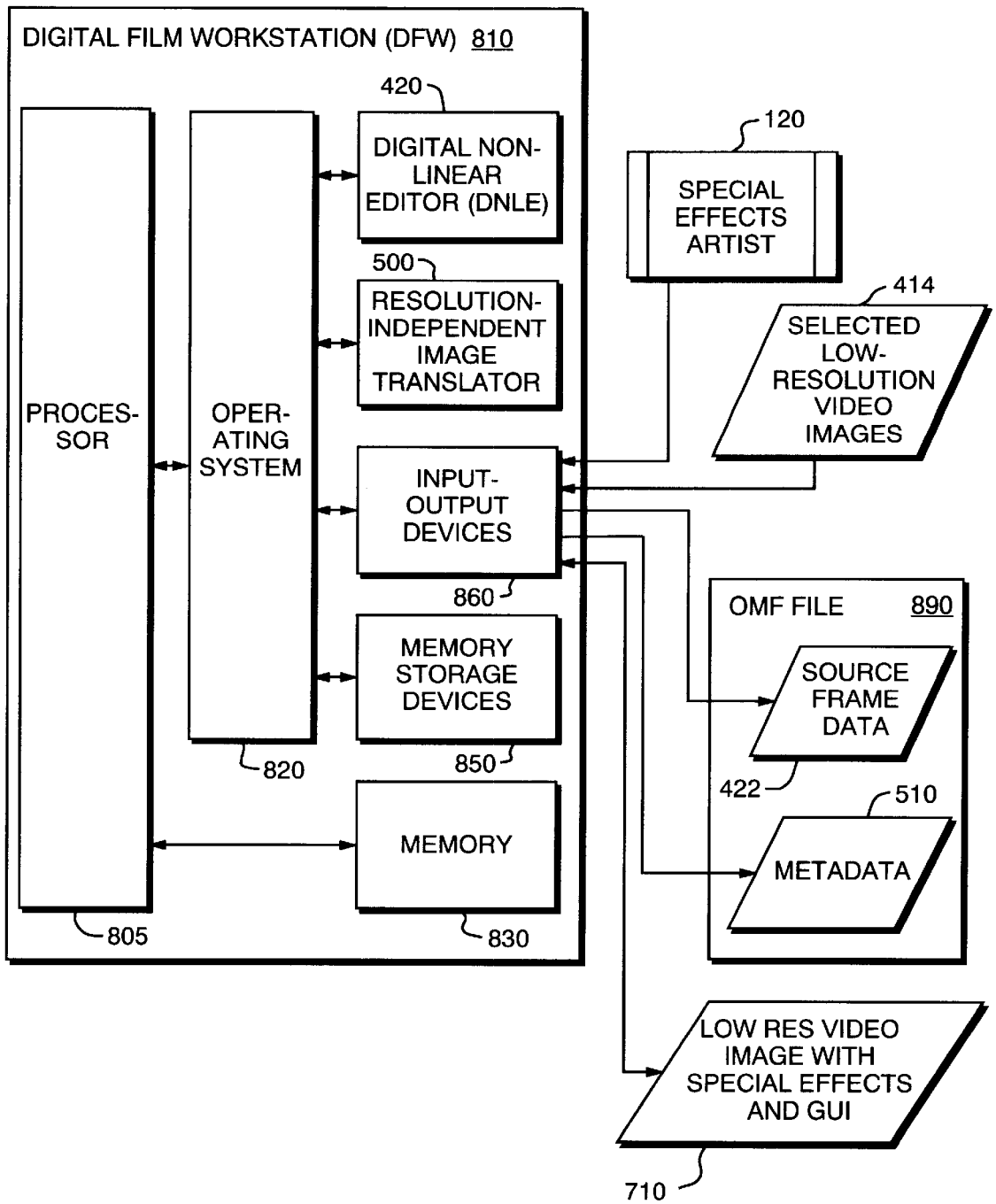
FIG. 8 is a simplified functional block diagram of one embodiment of a digital film workstation including an exemplary digital non-linear editor, and also including one embodiment of a resolution independent image translator of the present invention.

FIG. 8 is a simplified functional block diagram of one embodiment of a digital film workstation (DFW) including DNLE 420 of the system of FIGS. 5A–5B (hereafter, simply DNLE 420) and translator 500. Such illustrative DFW is referred to as DFW 810. With respect to FIG. 8, as well as FIGS. 5A–5B and 7, references are made to various functional modules of the present invention including DNLE 420 and translator 500. Such functional modules may be implemented either in software, hardware, firmware, or any combination thereof. For convenience of illustration, references generally are hereafter made to implementations in software.

Such references therefore typically refer to software-implemented functional modules that will be understood to comprise sets of software instructions that cause described functions to be performed. Similarly, in a software implementation, such functional modules may be referred to as "a set of DNLE instructions" or "a set of resolution-independent image translator instructions."

It will be understood by those skilled in the relevant art that the functions ascribed to aspects of DNLE 420 or translator 500 implemented using software instructions typically are performed by the central processing unit (CPU) of DFW 810. Typically such CPU executes such software instructions in cooperation with the operating system of DFW 810. Henceforth, the fact of such cooperation among the CPU, the operating system, and DNLE 420 or translator 500, whether implemented in software, hardware, firmware, or any combination thereof, may therefore not be repeated or further described, but will be understood to be implied. In particular, the cooperative functions of the operating system, which are well known to those skilled in the relevant art, may be omitted for clarity.

DFW 810 may be a personal computer, network server, workstation, or other computer platform now or later developed. User computer 110 may also be a device specially designed and configured to support and execute the functions of DNLE 420 and translator 500. DFW 810 includes known components such as processor 805, operating system 820, memory 830, memory storage devices 850, and input-output devices 860. It will be understood by those skilled in the relevant art that there are many possible configurations of the components of DFW 810 and that some components that may typically be included in DFW 810 are not shown, such as cache memory, a video card, a video capture card, an encryption/decryption card, a data backup unit, bus lines and other interconnecting or switching devices, and many other devices.

Processor 805 may be a commercially available processor such as a PA-RISC processor made by Hewlett-Packard Company, a SPARC® processor made by Sun Microsystems, a 68000 series microprocessor made by Motorola, an Alpha processor made by Digital Equipment Corporation, or it may be one of other processors that are or will become available. Also, DFW 810 may include a special-purpose processor (not shown) for increasing the speed of computations involving images or other graphics-oriented operations, encoding or decoding data, compressing data, or for other purposes. Processor 805 executes operating system 820, which may be, for example, one of the DOS, Windows 3.1, Windows for Work Groups, Windows 95, or Windows NT operating systems from the Microsoft Corporation; the System 7 or System 8 operating system from Apple Computer; the Solaris operating system from Sun Microsystems; the IRIX operating system employed, for example, on the Indigo computer from Silicon Graphics, Inc.; a Unix®-type operating system available from many vendors such as Sun Microsystems, Inc., Hewlett-Packard, or AT&T; the freeware version of Unix® known as Linux; the NetWare operating system available from Novell, Inc.; another or a future operating system; or some combination thereof. Operating system 820 interfaces with firmware and hardware in a well-known manner, and facilitates processor 805 in coordinating and executing the functions of the other components of DFW 810.

Memory 830 may be any of a variety of known memory storage devices or future memory devices, including, for example, any commonly available random access memory (RAM), magnetic medium such as a resident hard disk, or other memory storage device. Memory storage devices 850 may be any of a variety of known or future devices, including a compact disk drive, a tape drive, a removable hard disk drive, or a diskette drive. Such types of memory storage devices 850 typically read from, and/or write to, a randomly accessible, non-volatile, program storage device (not shown) such as a compact disk, magnetic tape, removable hard disk, floppy diskette, or other type of magnetic or magneto-optic disk. Any such program storage device may be a computer program product. As will be appreciated, such program storage devices typically include a computer usable storage medium having stored therein a computer software program and/or data.

Computer software programs, also called computer control logic, typically are stored in memory 830 and/or the program storage device used in conjunction with memory storage devices 850. Such computer software programs, when executed by processor 805, enable DFW 810 to perform the functions of the present invention as described herein. Accordingly, such computer software programs may be referred to as controllers of DFW 810.

In one embodiment, the present invention is directed to a computer program product comprising a computer usable medium having control logic (computer software program, including program code) stored therein. The control logic, when executed by processor 805, causes processor 805 to perform the functions of the invention as described herein. In another embodiment, the present invention is implemented primarily in hardware using, for example, a hardware state machine. Implementation of the hardware state machine so as to perform the functions described herein will be apparent to those skilled in the relevant arts.

Input devices of input-output devices 860 could include any of a variety of known or to-be-developed devices for accepting information from a user, whether a human or a machine, whether local or remote. Such devices include, for example a keyboard, mouse, touch-screen display, touch pad, microphone with a voice recognition device, network card, or modem. Output devices of input-output devices 860 could include any of a variety of known devices for communicating information with a user, whether a human or a machine, whether local or remote. Such devices include, for example, a video monitor; a video, S-video, or other input/output for connecting to a monitor, VCR, camcorder, telecine device, scanner, or other device; a printer; an audio speaker with a voice synthesis device, another audio output device; a network card; or a modem. Input-output devices 860 could also include any of a variety of known removable storage devices, including a compact disk drive, a tape drive, a removable hard disk drive, or a diskette drive.

Software aspects of the present invention could be implemented in the "C" or "C++" programming languages, although it will be understood by those skilled in the relevant art that many other high-level, or other, programming languages could also be used. Also, as noted, the present invention may be implemented in any combination of software, hardware, or firmware. If aspects of DNLE 420 or of translator 500 are implemented in software, such software may be loaded into memory storage devices 850 through one of input-output devices 860. Preferably, all or portions such software may also reside in a read-only memory or similar device of memory storage devices 850, such devices not requiring that such software first be loaded through input-output devices 860. It will be understood by those skilled in the relevant art that such software, or portions of it, may typically be loaded by processor 805 in a known manner into memory 830, or cache memory (not shown), or both, as advantageous for execution.

In one of many possible configurations, artist 120, or another user, initiates execution of DNLE 420 by use of an input device of input-output devices 860, such as a keyboard or mouse. Operating system 820, in a known manner, receives and interprets such input and, in cooperation with processor 805, causes DNLE 420 to be executed. In a known manner, DNLE 420 requests or accepts input of selected low-resolution video images 414 as produced, for example, by telecine device 410. Typically, such images are provided to DFW 810 through an input device of input-output devices 860, such as a video connector cooperating with a video card. Typically, images 414, if in digital form, are stored in memory 830 or in one of memory storage devices 850. If not in digital form, DNLE 420 typically employs an analog-to-digital converter (not shown) to convert such images to digital form for easier manipulation by DFW 810. Such converter may include software instructions of DNLE 420 and/or hardware or firmware included in DFW 810.

In cooperation with operating system 820 and processor 805, DNLE 420 accesses low-resolution video images 414 as stored in, for example, one of memory storage devices 850. Employing known techniques, DNLE 420 generates source frame data 422 that typically is stored in memory 830 or one of memory storage devices 850. Also employing known techniques, DNLE 420 generates low-resolution video images with special effects 424. In cooperation with operating system 820, processor 805, and one or more output device of input-output devices 860, such video images are displayed so that special effects may be rendered in reference thereto by artist 120, as described above. Typically, such output devices include a video board; video connector; and one or more monitors, screens, or other display devices. Such display devices may include, for example, a cathode ray tube display, one of a number of types of liquid crystal display devices, or a video player or recorder. Such display device may also be a printer.

In the illustrated embodiment, low-resolution video images with special effects 424 is displayed on a video output device of input-output devices 850, a graphical representation of which is shown as graphical element 1010 of FIG. 10, described below in relation to screen 710. Similarly, in a known manner, DNLE 420 also typically causes a graphical user interface, or other user interface, to be displayed together with images 424 on such video output device. An exemplary graphical representation of such a graphical user interface is shown as graphical element 1020 of FIG. 10, also described below in relation to screen 710.

In the illustrated embodiment, DNLE 420, in cooperation with operating system 820 and processor 805, passes control to translator 500; i.e., translator 500 is executed. Translator 500 generates metadata 510 and GUI 515 in a manner described with reference to FIGS. 9–11. As noted, metadata 510, together with source frame data 422, is provided to scanner 320, camera 130, or both. The mechanism for such data transfer is represented in the illustrative example of FIG. 8 as OMF file 890.

Resolution-Independent Image Translator 500

Figure 9:
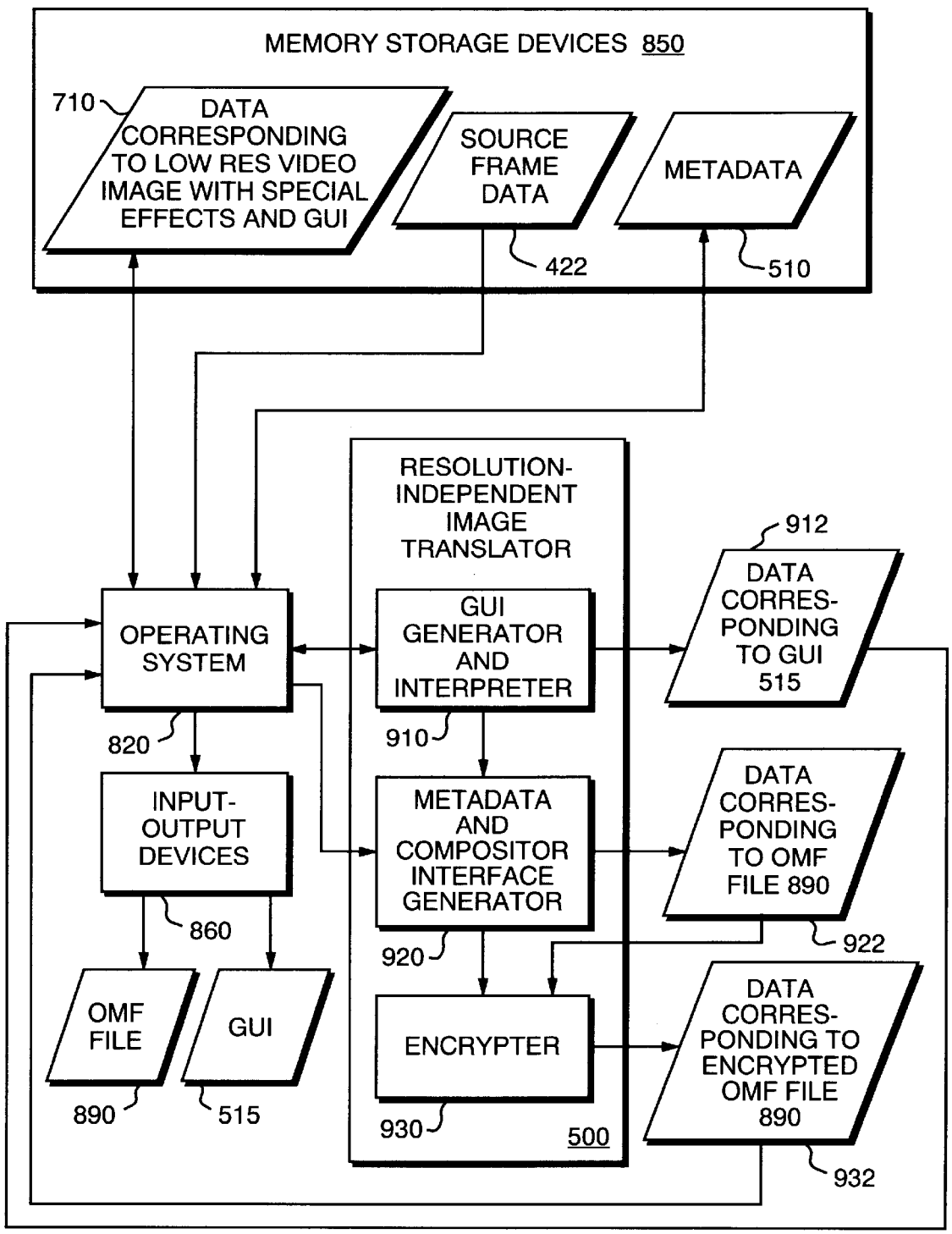
FIG. 9 is a functional block diagram of one embodiment of the resolution-independent image translator of FIG. 8.

FIG. 9 is a functional block diagram of one embodiment of resolution-independent image translator 500 as implemented in DFW 810, including a simplified representation of its connections to other modules of DFW 810. It is shown that among data stored in one of memory storage devices 850 is data communicated to and from translator 500 via operating system 820 (for clarity, the known role of processor 805 in such processes is not shown). Such data in memory storage devices 850 includes data corresponding to low-resolution video images with special effects 424 and to GUI 515, referred to as data 950. Also included in one of memory storage devices 850 are source frame data 422 and metadata 510. It will be understood by those skilled in the relevant art that all or some of such data may also be stored in memory 830, and that it is not material to the present invention where such data is stored.

Translator 500 includes GUI generator and interpreter 910, metadata and compositor interface generator 920, and, optionally, encrypter 930. GUI generator and interpreter 910 generates GUI 515 for accepting resolution and offset-related user input, typically from editor 110 or artist 120. GUI generator and interpreter 910 also interprets such user input and provides it to generator 920. Metadata and compositor interface generator 920 converts positional and description information regarding special effects. Such conversion is made to field chart coordinate and X-Y coordinates at the user-selected resolution. Generator 920 formats such converted information, and source frame data 422, into a standardized or machine-readable form, such as used in an OMF file. Encrypter 930 encrypts the data in the OMF file to protect against unauthorized access.

Figure 10:
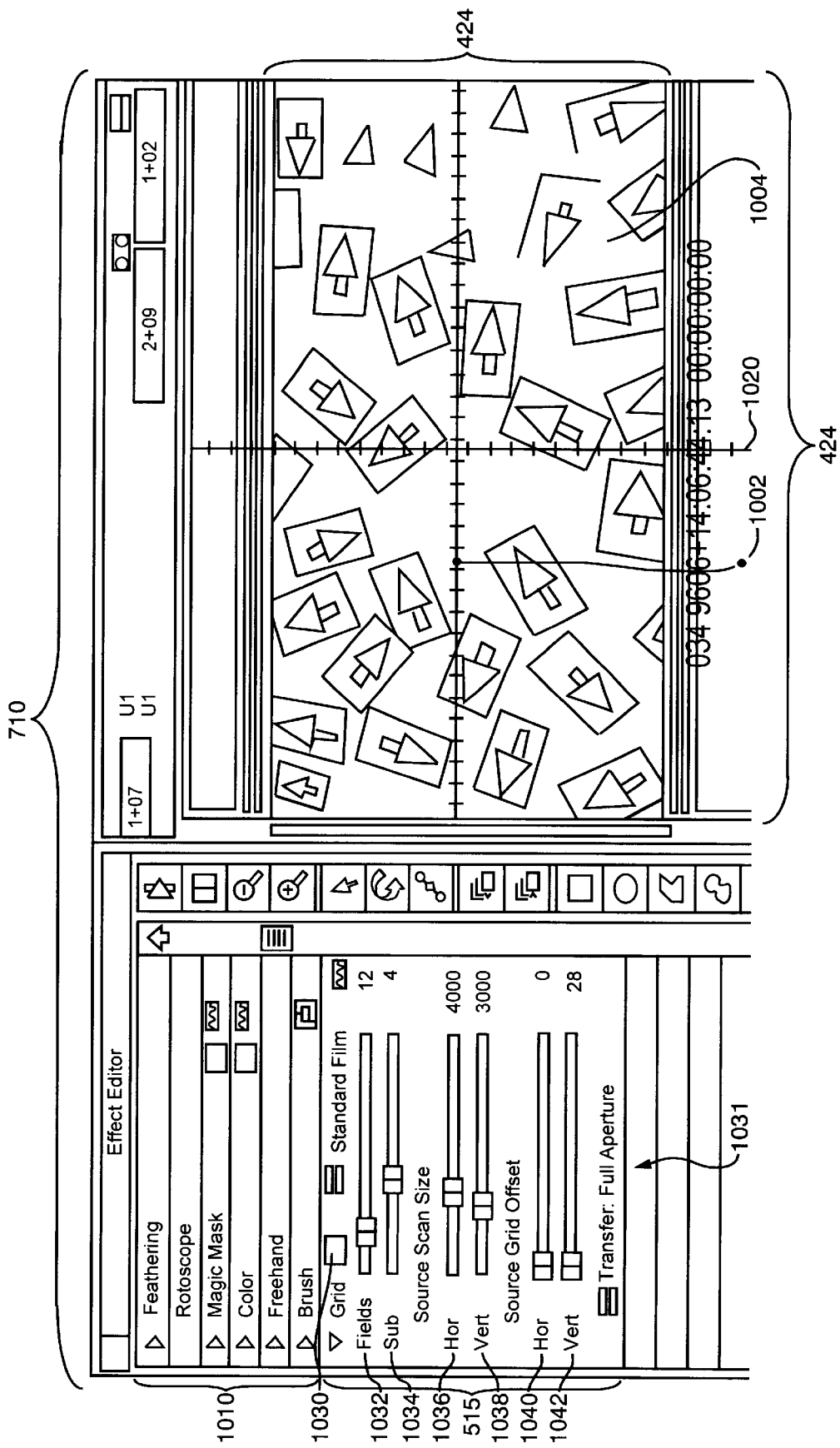
FIG. 10 is one implementation of a graphical representation of the screen of FIG. 7.

The operations of translator 500 are now described in greater detail with respect to FIGS. 10 and 11. FIG. 10 is one implementation of a graphical representation of screen 710 as displayed on an output device of input-output devices 860. FIG. 11 is an illustrative table showing an exemplary resolution-independent conversion of portions of metadata 510 by translator 500.

GUI Generator and Interpreter 910: In accordance with any of a variety of known techniques, GUI generator and interpreter 910 (hereafter, "GUI generator 910") generates GUI 515, as graphically shown in FIG. 10 as a portion of screen 710. It will be understood by those skilled in the relevant art that such exemplary graphical user interface is illustrative only, and that, in alternative implementations, many other graphical user interfaces could be employed. Also shown in FIG. 10 is a graphical user interface 1010 that typically is generated by DNLE 420 and is included in screen 710. The operation of graphical user interface 1010 is not material to the present invention.

As noted, GUI 515 is displayed, in cooperation with operating system 820, to editor 110 or artist 120 (referred to with respect to FIG. 10 simply as artist 120) on one of input-output devices 860. GUI 515 includes various graphical elements, one of which is grid button 1030. In a known manner, artist 120 positions cursor 1031 so that it is proximate to grid button 1030 and selects it, such as by clicking a mouse of input-output devices 860. Upon selection, grid button 1030 displays a pull-down menu (not shown), or any other of many similar known graphical elements, so that artist 120 may further select the type of grid, such as illustrative grid 1020, that is to overlayed upon low-resolution video images with special effects 424. For example, as described in greater detail below, such grid may be a field-chart grid in a form similar to those of the field chart overlays typically used in accordance with the system of FIG. 1. Alternatively, such grid may be in the form of X-Y coordinates based on pixel spacing, described below. With respect to either alternative, artist 120 may also select a particular aspect ratio (ratio of height and width) to be applied to grid 1020. With respect to the illustrated embodiment, it will be assumed that artist 120 determines that a field chart grid shall be employed.

GUI 515 also includes various graphical elements commonly known as slide bars, each of which has a slide bar button, a bar upon which the button slides, and a numerical indicator of a value indicative of the location of the button on the slide bar. In the illustrated implementation, such numerical indicators are positioned to the right of their corresponding slide bars. One of such graphical elements is fields slide bar 1032. Typically using cursor 1031, artist 120 selects the button of fields slide bar 1032 and positions it along the slide bar until the numerical indicator indicates a desired value that, in one illustrative example, is an integer in the range of one to 20. Such selected numerical value indicates the number of field-chart fields with respect to which the special effects renderings of artist 120 are to be specified in metadata 510. For example, if such selected numerical value is 18, then low-resolution video images with special effects 424 is divided into 14 fields. GUI generator 910 causes grid 1020 to be overlayed upon images 424, assuming that artist 120 has selected the field chart option using grid button 1030. In the illustrated implementation, each tick mark on grid 1020 indicates one field.

Similarly, subfields slide bar 1034 (labeled "Sub" in the representation of FIG. 10) is employed by artist 120 to indicate a desired number of subfields, ranging, for example, from the integers one to 10. Subfields are not displayed in such implementation, but may be in alternative implementations. However, as noted below, such subfield selection determines the resolution by which subfield positions are specified in metadata 510.

The numerical indicators to the right of horizontal source scan size slide bar 1036 and vertical source scan size slide bar 1038 indicate the horizontal (X) and vertical (Y) resolutions specified by the operator of scanner 320, or by scanner 320 itself, when frames of film 105 specified by source frame data 422 were scanned. In the illustrated embodiment, such resolution values are provided by artist 120 by selecting such numerical indicators in GUI 515 and entering the appropriate values. In alternative embodiments, such values may be provided automatically by machine-to-machine data exchange between scanner 320 and an input device of input-output devices 860.

The buttons on slide bar 1036 and slide bar 1038 may be positioned so that X-Y coordinate information regarding the location and description of special effects are expressed at any desired resolution in metadata 510. For example, it may be assumed that both such slide bars represent a range of numbers (which may, but need not, be integers) ranging from one to 10,000. If artist 120 positions the respective buttons on the slide bars to their mid-way position along the slide bar, such X-Y coordinate information is expressed at a resolution of 5,000 by 5,000 pixels, as described below in relation to FIG. 11. Optionally, numerical values (not shown) are included in GUI 515 to indicate the resolution so chosen by sliding buttons on slide bars 1036 and 1038.

GUI 515 also includes horizontal source grid offset slide bar 1040 and vertical source grid offset slide bar 1042. Slide bars 1040 and 1042 are used to correct any offset errors that may have been introduced in the images generated by telecine device 410 and/or scanner 320. In particular, artist 120 positions cursor 1031 so that it points to and selects any uniquely identifiable pixel of any frame of images 424, for example, the upper left corner of one of the mousetraps pictured in the illustrative frame of images 424, indicated in FIG. 10 as point 1004. For illustrative purposes, it is assumed that the numerical values of the X-Y coordinates (not shown) displayed as a result of the selection of point 1004 are 1000 X, 1500 Y. Similarly, the same pixel is selected from the corresponding frame of high-resolution digital images 325 using high-resolution compositor 330. It is assumed that the X-Y coordinates so specified by compositor 330 are 1000X, 1528Y. In order to correct this discrepancy, artist 120 slides the button of vertical source grid offset slide bar 1042 until the value "28" appears to the right of such bar. Such offset information is provided to translator 500, which adjusts grid 1020 so that the coordinates of point 1004 in the illustrative frame of images 424 is 1000X, 1528Y. Generator 910 makes such, and other, changes to GUI 515, in accordance with known techniques, by altering data 912 that specifies the content of GUI 515.

The information thus provided to generator 910 by artist 120 is provided to metadata and compositor interface generator 920 (hereafter referred to simply as "metadata generator 920"). To illustrate the functions of metadata generator 920, it is assumed that artist 120 desires to replicate one of the mousetraps in the illustrative frame of images 424 of FIG. 10 (a process commonly referred to as "cloning") and position such cloned mousetrap such that its upper left corner is located at point 1002. To specify such location, artist 120 typically positions curser 1031 at point 1002 and clicks the mouse, or otherwise selects such location. It is further assumed for illustrative purposes that, in selecting an option from grid 1030, artist 120 has indicated that images 424 have a resolution of 740 pixels along the X axis and 486 pixels along the Y axis. It is also illustratively assumed that point 1002 is located at coordinates 296X, 243Y in such 740 by 486 resolution.

Metadata generator 920 scales such coordinates to field chart coordinates at the resolution selected by artist 120 by moving the buttons of slide bars 1032 and 1034. Metadata generator 920 also scales such coordinates to X-Y coordinates at the resolution selected by artist 120 by moving the buttons of slide bars 1040 and 1042. For example, it is assumed for illustrative purposes that artist 120 has so selected a field chart resolution of 20 fields and 10 subfields. The horizontal (i.e., east-west) coordinates are generated by metadata generator 920 by applying the ratio of 296 to 740 (i.e., 0.4) to the horizontal field chart size of 20 fields. Such application yields a horizontal field chart coordinate of 8 fields. Any interpolation between fields is similarly generated based on the number of subfields. That is, if the horizontal coordinate of point 1002 in the 740 by 486 coordinate system corresponded to a point two-thirds between the eighth and ninth field in the field chart coordinate system, such location would be generated by metadata generator 920 to be 8.7 fields. Metadata generator 920 similarly determines the field chart coordinate for the vertical axis.

As noted, metadata generator 920 also generates X-Y coordinates for point 1002 at the resolution selected by artist 120 by moving the buttons of slide bars 1040 and 1042. For example, if a resolution of 5,000 by 5,000 pixels had been so selected, metadata generator 920 generates the X coordinate of point 1002 by applying the ratio of 296 to 740 (i.e., 0.4) to 5,000. Thus, the X coordinate at the selected resolution of 5,000 by 5,000 is 2,000 pixels. The Y coordinate at the selected resolution is similarly generated.

A further illustrative example is shown in FIG. 11. The X and Y coordinates in columns 1110 indicate the locations of special effect markers as specified by artist 120 in relation to a particular frame of images 424, as described above. The X and Y coordinates in columns 1120 indicate the locations of such markers as generated by metadata generator 920 in an X-Y coordinate system having a resolution of 2048 pixels along the X axis and 1065 pixels along the Y axis. Thus, for example, coordinate 1101, having a value of 8 at a resolution of 740 by 486 pixels, is used by metadata generator 920 to generate a corresponding value of 21, shown as coordinate 1103, at a resolution of 2048 by 1065 pixels. That is, the ratios of coordinates 1101 and 1103 to the maximum number of pixels along the X axis in their respective resolutions are substantially the same (with rounding in this illustrative example). In a similar manner, metadata generator 920 generates Y coordinate 1104 at a resolution of 2048 by 1065 corresponding to Y coordinate 1102 at resolution 740 by 486.

Metadata generator 920 applies such process to all positional information and special effects information regarding the special effects rendered by artist 120 in reference to images 424. Such information is hereafter referred to as "resolution-independent coordinate data." For example, the resolution-independent coordinate data so generated with respect to a special effects marker is represented by elements 642 and 644 described above with respect to FIG. 6. Metadata generator 920 formats such resolution-independent coordinate data in accordance with any known, or to-be-developed, standard, such as that employed in an OMF file. Metadata generator 920 also so formats source frame data 422, which typically is provided from one of memory storage devices 850 to metadata generator 920 in cooperation with operating system 820. The resolution-independent coordinate data and source frame data so generated by metadata generator 920 is shown in FIG. 9 as data block 922. As indicated in the illustrative example of FIG. 9, the data block 922 thus represents data corresponding to OMF file 890.

Optionally, encrypter 930 encrypts data 922 in accordance with any of a variety of known or to-be-developed encryption techniques. The resulting encrypted data 932 is provided via operating system 820 and an output device of input-output devices 860 so that it may be provided to scanner 320, or camera 130, as described above with respect to FIGS. 5A–5B.

OMF file 890 may be distributed using a variety of techniques and mediums to a high-resolution compositor, camera, or other device for rendering special effects. For example, OMF file 890 may be stored on one or more of memory storage devices 850, such as a floppy disk, and delivered to a user in a location different than that of DFW 810. Also, as noted, such data may be delivered over a network, or by direct transmission using wire, fibre optics, radio transmission, television transmission, or any other technique now known, or later to be developed, for communicating information.

Having now described one embodiment of the present invention, it should be apparent to those skilled in the relevant art that the foregoing is illustrative only and not limiting, having been presented by way of example only. Many other schemes for distributing functions among the various functional modules of the illustrated embodiment are possible in accordance with the present invention. Moreover, the functions of any module, while described in the illustrated embodiment primarily in terms of high-resolution film and low-resolution video, may be applied in alternative embodiments to other types of high-resolution and low-resolution images, or to images irrespective of their resolution. In addition, such functions may be applied to data sets that do not describe pixel-based images but that involve conversions between high-resolution and low-resolution versions of a data set.

For example, with respect to alternative types of images, the high-resolution images generated or used in accordance with the present invention may be those produced for use with high-definition television (HDTV) system, digital X-ray images, or any other high-resolution image. Thus, the functional modules that operate upon such high-resolution images need not be a film projector, telecine device, scanner, high-resolution compositor, film recorder, or another module as described above with respect to the illustrated embodiment. Rather, in alternative embodiments, such modules may operate similarly on other types of high-resolution images; for example, telecine device 410 may more generally be a high-resolution to low-resolution converter, scanner 320 may more generally be a high-resolution digitizer, film recorder 340 may more generally be a high-resolution digital-to-analog converter, and so on. As another, non-limiting, example, high-resolution, digital, images with special effects 332 may, in alternative embodiments, by analog images with special effects.

Similarly, low-resolution images may be, instead of video images such as video proxy image 335, low-resolution film images or printed images, as illustrative examples. DNLE 420, described above with respect to low-resolution editing of video images, may more generally be any low-resolution device operating on other types of low-resolution images. In yet other alternative embodiments, images described herein as low-resolution images may be high-resolution images. For example, video proxy image 335 may be a high-resolution HDTV image.

Also, there are many possible variations and combinations of the architecture for the data structures described above, including source frame data 422 and metadata 510, which may be combined into one data structure. It will be evident to those skilled in the relevant art that such, and other, data structures typically are stored in memory 830, although one or more could be stored in memory storage device 850, or another device for storing data. As will be evident to those skilled in the relevant art, the values in data structures generally are initialized or re-initialized in accordance with any of a variety of known techniques to provide that such values are accurate. Such initializations or re-initializations of data structures therefore are assumed, but may not be described. Also the coordinate and grid systems for specifying positional information regarding special effects described above are illustrative of those commonly used at present in the film and video industry. However, the present invention is not limited by such illustrative examples, and may be applied to other schemes for providing such positional information, now available or to be developed in the future.

In addition, it will be understood by those skilled in the relevant art that control and data flows between and among functional modules of the invention and various data structures may vary in many ways from the control and data flows described above. More particularly, intermediary functional modules (not shown) may direct control or data flows; the functions of various modules may be combined, divided, or otherwise rearranged to allow parallel processing or for other reasons; intermediate data structures may be used; various described data structures may be combined; the sequencing of functions or portions of functions generally may be altered; and so on. In particular, the functions of DNLE 420 and translator 500 may be integrated so as to be included in the same, or coordinated, system module. They may also be so included in the same, or coordinated, software, hardware, or firmware product, or any combination of such system module or product.

As is evident, editor 110, artist 120, the photographer or operator (not shown) of camera 130 may be any number of people, including one person. The particular division of responsibilities of such persons as described above is provided for clarity and illustrative purposes only. Also, any function ascribed to any of such people may, in alternative embodiments, be performed by a machine.

Numerous other embodiments, and modifications thereof, are contemplated as falling within the scope of the present invention as defined by appended claims and equivalents thereto.

What is claimed is:

1. A process for applying an effect to one or more images in a motion picture, comprising:
   capturing a source to generate a first sequence of one or more images in a first spatial resolution;
   specifying a location in the first spatial resolution of the effect in one or more images of the first sequence of images;
   capturing the source to generate a second sequence of one or more images in a second spatial resolution and corresponding to the images in the first spatial resolution used by the effect;
   receiving information indicative of any offset between a point in an image in the first sequence of images and a corresponding point in an image in the second sequence of images; and
   applying the effect to one or more images in the second sequence of images in the second spatial resolution according to the location specified in the first spatial resolution and the offset.

2. The process of claim 1, further comprising:
   determining an amount of any scaling between an image in the first sequence of images and an image in the second sequence of images; and
   wherein applying the effect further is performed according to the scaling.

3. The process of claim 2, wherein applying comprises:
   storing information indicative of the location of the effect in a format defined according to the second spatial resolution.

4. The process of claim 3, wherein applying comprises:
   exporting the stored information as metadata to a compositor that receives the second sequence of one or more images; and
   wherein the compositor performs the step of applying the effect according to the metadata to one or more images in the second sequence of images.

5. The process of claim 4, wherein the exported metadata is stored as a text data file.

6. The process of claim 1, wherein applying comprises:
   storing information indicative of the location of the effect.

7. The process of claim 6, wherein applying comprises:
   exporting the stored information as metadata to a compositor that receives the second sequence of one or more images; and
   wherein the compositor performs the step of applying the effect according to the metadata to one or more images in the second sequence of images.

8. The process of claim 7, wherein the exported metadata is stored as a text data file.

9. The process of claim 6, wherein the information indicative of the location is stored in coordinates of a field chart superimposed on the image.

10. The process of claim 6, wherein the information indicative of the location is stored in coordinates corresponding to the first spatial resolution.

11. The process of claim 10, wherein the information indicative of the location is stored in coordinates of a field chart superimposed on the image.

12. The process of claim 6, wherein the information indicative of the location is stored in coordinates corresponding to the second spatial resolution.

13. The process of claim 12, wherein the information indicative of the location is stored in coordinates of a field chart superimposed on the image.

14. The process of claim 1, wherein the first spatial resolution is less dense than the second spatial resolution.

15. The process of claim 1, wherein the first spatial resolution is the same as the second spatial resolution.

16. The process of claim 1, further comprising specifying a shape for the effect at the specified location.

17. The process of claim 16, wherein the shape and the location of the effect is specified for each of a plurality of key frames for the effect.

18. The process of claim 1, wherein the location of the effect is specified for each of a plurality of key frames for the effect.

19. A process for defining an effect in one or more images in a motion picture, comprising:
   capturing a source to generate a first sequence of one or more images in a first spatial resolution;
   using the nonlinear editing system, specifying a location in the first spatial resolution of the effect in one or more images of the first sequence of images;
   receiving information indicative of a second spatial resolution in which a second sequence of one or more images is captured from the source and information indicative of any offset between a point in an image in the first sequence of images and a corresponding point in an image in the second sequence of images; and
   determining a specification of the effect in the second spatial resolution according to the location in the first spatial resolution and the offset.

20. The process of claim 19, further comprising:
   receiving information indicative of any scaling between an image in the first sequence of images and an image in the second sequence of images; and
   wherein determining the specification of the effect further is performed according to the scaling.

21. The process of claim 20, further comprising storing information indicative of the location of the effect in a format defined according to the second spatial resolution.

22. The process of claim 21, further comprising exporting the stored information as metadata to a compositor that receives the second sequence of one or more images and applies the effect according to the metadata to one or more images in the second sequence of images.

23. The process of claim 22, wherein the exported metadata is stored as a text data file.

24. The process of claim 19, further comprising storing information indicative of the location of the effect.

25. The process of claim 24, further comprising exporting the stored information as metadata to a compositor that receives the second sequence of one or more images and applies the effect according to the metadata to one or more images in the second sequence of images.

26. The process of claim 25, wherein the exported metadata is stored as a text data file.

27. The process of claim 24, wherein the information indicative of the location is stored in coordinates of a field chart superimposed on the image.

28. The process of claim 24, wherein the information indicative of the location is stored in coordinates corresponding to the first spatial resolution.

29. The process of claim 28, wherein the information indicative of the location is stored in coordinates of a field chart superimposed on the image.

30. The process of claim 24, wherein the information indicative of the location is stored in coordinates corresponding to the second spatial resolution.

31. The process of claim 30, wherein the information indicative of the location is stored in coordinates of a field chart superimposed on the image.

32. The process of claim 19, wherein the first spatial resolution is less dense than the second spatial resolution.

33. The process of claim 19, wherein the first spatial resolution is the same as the second spatial resolution.

34. The process of claim 19, further comprising specifying a shape for the effect at the specified location.

35. The process of claim 34, wherein the shape and the location of the effect is specified for each of a plurality of key frames for the effect.

36. The process of claim 19, wherein the location of the effect is specified for each of a plurality of key frames for the effect.

37. A process for applying an effect to one or more images of a motion picture, comprising:
- receiving information indicative of a location in a first spatial resolution of the effect in one or more images in a first sequence of images captured from a source;
- capturing the source to generate a second sequence of one or more images in a second spatial resolution and corresponding to the images in the first spatial resolution used by the effect;
- receiving information indicative of any offset between a point in an image in the first sequence of images and a corresponding point in an image in the second sequence of images; and
- applying the effect to one or more images in the second sequence of images in the second spatial resolution according to the location specified in the first spatial resolution and the received offset.

38. The process of claim 37, further comprising:
- receiving information indicative of any scaling between an image in the first sequence of images and an image in the second sequence of images; and
- wherein applying the effect further is performed according to the scaling.

39. A process for specifying an effect for one or more images in a motion picture, comprising:
- receiving information indicative of a location in a first spatial resolution of the effect in one or more images of a first sequence of images captured from a source in the first spatial resolution;
- receiving information indicative of any offset from one or more of the images in the first sequence of images in the first spatial resolution to one or more images in a second sequence of images captured from the source in the second spatial resolution and corresponding to the images in the first spatial resolution used by the effect; and
- determining a specification of the effect in the second spatial resolution according to the location in the first spatial resolution and the offset.

40. A method of operation of a graphical user interface for defining effects in a nonlinear video editing system, comprising:
- displaying a first image of a field chart superimposed on an image;
- receiving information indicative of a location in coordinates corresponding to pixels in the image;
- translating the information indicative of the location into coordinates corresponding to the field chart; and
- storing the coordinates corresponding to the field chart.

41. The method of operation of claim 40, further comprising storing the location in coordinates corresponding to pixels in the image in association with the coordinates corresponding to the field chart.

42. A process for applying an effect to one or more images in a motion picture, comprising:
- capturing a source to generate a first sequence of one or more images;
- specifying parameters of the effect with respect to one or more images of the first sequence of images;
- capturing the source to generate a second sequence of one or more images corresponding to the one or more images in the first sequence of images that are used in the effect;
- receiving information indicative of differences between an image in the first sequence of images and a corresponding image in the second sequence of images; and
- applying the effect to one or more images in the second sequence of images according to the parameters specified with respect to the first sequence of images and adjusted according to the differences between an image in the first sequence of images and a corresponding image in the second sequence of images.

* * * * *